US012782998B2

(12) United States Patent
Zhang et al.

(10) Patent No.: US 12,782,998 B2
(45) Date of Patent: Nov. 3, 2026

(54) OPTICAL COMPUTING APPARATUS, METHOD, AND SYSTEM

(71) Applicant: Huawei Technologies Co., Ltd., Shenzhen (CN)

(72) Inventors: Jiaxu Zhang, Hong Kong (CN); Yinyi Liu, Hong Kong (CN); Yuxiang Fu, Hong Kong (CN); Chengeng Li, Hong Kong (CN); Jiang Xu, Hong Kong (CN); Tongyu Wu, Hangzhou (CN); Yajie Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 274 days.

(21) Appl. No.: 18/750,730

(22) Filed: Jun. 21, 2024

(65) Prior Publication Data

US 2024/0345616 A1 Oct. 17, 2024

Related U.S. Application Data

(63) Continuation of application No. PCT/CN2022/138531, filed on Dec. 13, 2022.

(30) Foreign Application Priority Data

Dec. 23, 2021 (CN) ......................... 202111590006.5

(51) Int. Cl.
*G06E 3/00* (2006.01)

(52) U.S. Cl.
CPC ............. *G06E 3/005* (2013.01); *G06E 3/008* (2013.01)

(58) Field of Classification Search
CPC ........... G06E 3/005; G06E 3/008; G06E 3/00; G06N 3/0464; G06N 3/0675; G06N 3/04;
(Continued)

(56) References Cited

U.S. PATENT DOCUMENTS

2014/0299743 A1* 10/2014 Miller .................. G02B 27/145 359/629
2016/0204878 A1* 7/2016 Goodwill ......... H04B 10/25759 398/115

(Continued)

FOREIGN PATENT DOCUMENTS

CN 110505021 A 11/2019
CN 111208690 A 5/2020

(Continued)

*Primary Examiner* — Balram T Parbadia
(74) *Attorney, Agent, or Firm* — Slater Matsil, LLP

(57) ABSTRACT

An optical computing apparatus includes: an operation module, configured to modulate a first group of optical signals based on N first electric signals to output a second group of optical signals, modulate a third group of optical signals based on N second electric signals to output a fourth group of optical signals, and adjust delays and phases of the second group of optical signals and the fourth group of optical signals; and a beam combining module, configured to combine an adjusted second group of optical signals and an adjusted fourth group of optical signals to output a fifth group of optical signals, where the fifth group of optical signals indicates a multiply-add operation result of input data and a first weight matrix and a second weight matrix.

20 Claims, 8 Drawing Sheets

(58) Field of Classification Search
CPC ........... G06N 3/067; G02F 1/21; G02F 1/225; G06F 17/16
See application file for complete search history.

(56) References Cited

U.S. PATENT DOCUMENTS

| | | | | |
|---|---|---|---|---|
| 2023/0045938 | A1* | 2/2023 | Carolan | G02F 1/225 |
| 2023/0198620 | A1* | 6/2023 | Lu | H04B 10/40 398/24 |

FOREIGN PATENT DOCUMENTS

| | | | |
|---|---|---|---|
| CN | 111561953 | A | 8/2020 |
| CN | 113162724 | A | 7/2021 |
| CN | 113325917 | A | 8/2021 |
| CN | 113630207 | A | 11/2021 |
| TW | 202403491 | A | 1/2024 |
| WO | 2020191217 | A1 | 9/2020 |

* cited by examiner (a)

(b)

(c)

(d)

OPTICAL COMPUTING APPARATUS, METHOD, AND SYSTEM

CROSS-REFERENCE TO RELATED APPLICATIONS

This application is a continuation of International Application No. PCT/CN2022/138531, filed on Dec. 13, 2022, which claims priority to Chinese Patent Application No. 202111590006.5, filed on Dec. 23, 2021. The disclosures of the aforementioned applications are hereby incorporated by reference in their entireties.

TECHNICAL FIELD

Embodiments of this application relate to the field of optical communication, and more specifically, to an optical computing apparatus, method, and system.

BACKGROUND

Optical computing features in high performance and low energy consumption, and has attracted wide attention. The optical computing may be used in the field of artificial intelligence (AI) to improve an operation speed of a neural network model.

According to an implementation principle, an optical computing system may be classified into a spatial optical computing system and an on-chip optical computing system. The spatial optical computing system mainly includes a 4F system, completes convolution through Fourier transform, and simulates a neural network model such as a convolutional neural network (CNN). The on-chip optical computing system mainly uses optical devices such as a Mach-Zehnder modulator (MZM) to construct an optical multiplier-adder, such as an optical neural network (ONN) of Massachusetts Institute of Technology.

Although the optical computing can accelerate a computing part that occupies a large amount of computing power in the neural network model, because parallel computing capabilities of computing apparatuses in the current spatial optical computing system and on-chip optical computing system are poor, computing power of the optical computing system cannot be significantly improved.

SUMMARY

Embodiments of this application provide an optical computing apparatus, method, and system, to help improve a parallel computing capability of the optical computing system, to further improve computing power.

According to a first aspect, an optical computing apparatus is provided. The apparatus includes an operation module, configured to modulate a first group of optical signals based on N first electric signals to output a second group of optical signals. The first group of optical signals indicates input data. The first group of optical signals includes N input optical signals. Wavelengths of the N input optical signals are all different, where N is a positive integer greater than 2. Wavelengths of optical signals modulated by using the N first electric signals are in one-to-one correspondence with the wavelengths of the N input optical signals. The N first electric signals respectively indicate N parts of a first weight matrix. The second group of optical signals indicates a calculation result of the input data and the first weight matrix.

The operation module is further configured to modulate a third group of optical signals based on N second electric signals to output a fourth group of optical signals. The third group of optical signals indicates the input data. The third group of optical signals includes the N input optical signals. Wavelengths of optical signals modulated by using the N second electric signals are in one-to-one correspondence with the wavelengths of the N input optical signals. The N second electric signals respectively indicate N parts of a second weight matrix. The third group of optical signals indicates a calculation result of the input data and the second weight matrix.

The operation module is further configured to adjust delays and phases of the second group of optical signals and the fourth group of optical signals.

The apparatus includes a beam combining module, configured to combine an adjusted second group of optical signals and an adjusted fourth group of optical signals to output a fifth group of optical signals. The fifth group of optical signals indicates a multiply-add operation result of the input data and the first weight matrix and the second weight matrix.

According to this embodiment of this application, the wavelengths of the optical signals modulated by using the N first electric signals all correspond to the wavelengths of the N input optical signals, and each of the N first electric signals is used to modulate only an optical signal of one wavelength. Therefore, modulation performed by using the N first electric signals on the N input optical signals may be considered as parallel modulation between optical signals of N wavelengths, and modulation performed by using the N second electric signals on the N input optical signals may also be considered as parallel modulation between optical signals of N wavelengths. In addition, both the N first electric signals and the N second electric signals may implement modulation on the input data, in other words, modulation between the first weight matrix and the second weight matrix is also parallel. The optical computing apparatus combines parallel modulation results of the N first electric signals and the N second electric signals, to implement the multiply-add operation result of the input data and the first weight matrix and the second weight matrix. This helps improve a parallel computing capability of the optical computing apparatus.

Optionally, each of the N first electric signals is used to modulate one of the N input optical signals.

With reference to the first aspect, in some implementations of the first aspect, the apparatus further includes a demultiplexing and recombination module, configured to demultiplex and/or recombine the fifth group of optical signals to obtain a sixth group of optical signals. The sixth group of optical signals includes optical signals of Q wavelengths in the fifth group of optical signals. The sixth group of optical signals indicates output data, and Q is a positive integer less than or equal to N.

In this embodiment of this application, the multiply-add operation result of the input data and the first weight matrix and the second weight matrix may be demultiplexed and/or recombined. Therefore, summation of optical signals of specific wavelengths can be implemented. For data processing, this manner is more flexible.

With reference to the first aspect, in some implementations of the first aspect, the apparatus further includes a multiplexing module, configured to modulate N parts of the input data into the N input optical signals, and multiplex the N input optical signals into a same waveguide to form a seventh group of optical signals. The apparatus includes a beam splitting module, configured to split the seventh group of optical signals to form the first group of optical signals and the third group of optical signals.

Therefore, in this embodiment of this application, the input data can be modulated into optical signals of a plurality of wavelengths, the optical signals of the plurality of wavelengths are multiplexed into a same waveguide, and the seventh group of optical signals that indicate the input data is split into a plurality of beams, so that the operation module can separately perform operation processing on the plurality of beams of optical signals, and optical signals of a plurality of wavelengths in each beam can also be separately processed. This helps improve a parallel processing capability of a system.

With reference to the first aspect, in some implementations of the first aspect, the apparatus further includes a multiplexing module, configured to modulate N parts of the input data into the N input optical signals, and multiplex the N input optical signals into a same waveguide to separately form the first group of optical signals and the third group of optical signals.

Therefore, in this embodiment of this application, the input data can be modulated into optical signals of a plurality of wavelengths, and the optical signals of the plurality of wavelengths are multiplexed into a same waveguide, to form a plurality of beams of optical signals, so that the operation module can separately perform operation processing on the plurality of beams of optical signals, and optical signals of a plurality of wavelengths in each beam can also be separately processed. This helps improve a parallel processing capability of a system.

With reference to the first aspect, in some implementations of the first aspect, the apparatus further includes a loading and detection module, configured to: split the first weight matrix into N parts, and configure the N parts of the first weight matrix to be in one-to-one correspondence with the N wavelengths; split the second weight matrix into N parts, and configure the N parts of the second weight matrix to be in one-to-one correspondence with the N wavelengths; and separately load the N first electric signals and the N second electric signals onto the operation module.

Therefore, in this embodiment of this application, the loading and detection module may split a weight matrix into N parts based on wavelengths that can be modulated by the operation module, and each part corresponds to one wavelength. In other words, in this application, parallelism of the system can be improved through wavelength multiplexing, and operation complexity of the system can also be reduced.

With reference to the first aspect, in some implementations of the first aspect, the loading and detection module is further configured to: transform the input data into N parts, and configure the N parts of the input data to be in one-to-one correspondence with the N wavelengths; and load the N parts of the input data onto the multiplexing module, where the multiplexing module is configured to transmit the first group of optical signals and the third group of optical signals to the operation module.

Therefore, in this embodiment of this application, the loading and detection module may transform the input data into N parts based on the wavelengths that can be modulated by the operation module, and each input part corresponds to one wavelength. In other words, in this application, the parallelism of the system can be improved through the wavelength multiplexing, and the operation complexity of the system can also be reduced.

With reference to the first aspect, in some implementations of the first aspect, the operation module includes N first modulators, configured to modulate the N input optical signals based on the N first electric signals. Wavelengths of optical signals modulated by the N first modulators are in one-to-one correspondence with the wavelengths of the N input optical signals. The operation module includes N second modulators, configured to modulate the N input optical signals based on the N second electric signals. Wavelengths of optical signals modulated by the N second modulators are in one-to-one correspondence with the wavelengths of the N input optical signals.

Therefore, in this embodiment of this application, multi-wavelength and multi-channel parallel modulation can be performed on the input data, to improve computing power of the optical computing apparatus.

With reference to the first aspect, in some implementations of the first aspect, the operation module includes: a first delay controller, configured to adjust the delay and the phase of the second group of optical signals; and a second delay controller, configured to adjust the delay and the phase of the fourth group of optical signals.

In this embodiment of this application, the delay and the phase of the optical signal can be adjusted, to enable an effect generated when optical signals on different channels are combined to be approximate to an effect of addition. This helps improve an effect of optical computing.

According to a second aspect, an optical computing method is provided. The method includes: An operation module modulates a first group of optical signals based on N first electric signals to output a second group of optical signals. The first group of optical signals indicates input data. The first group of optical signals includes N input optical signals. Wavelengths of the N input optical signals are all different, where N is a positive integer greater than 2. Wavelengths of optical signals modulated by using the N first electric signals are in one-to-one correspondence with the wavelengths of the N input optical signals. The N first electric signals respectively indicate N parts of a first weight matrix. The second group of optical signals indicates a calculation result of the input data and the first weight matrix. The operation module modulates a third group of optical signals based on N second electric signals to output a fourth group of optical signals. The third group of optical signals indicates the input data. The third group of optical signals includes the N input optical signals. Wavelengths of optical signals modulated by using the N second electric signals are in one-to-one correspondence with the wavelengths of the N input optical signals. The N second electric signals respectively indicate N parts of a second weight matrix. The third group of optical signals indicates a calculation result of the input data and the second weight matrix. The operation module adjusts delays and phases of the second group of optical signals and the fourth group of optical signals. A beam combining module combines an adjusted second group of optical signals and an adjusted fourth group of optical signals to output a fifth group of optical signals. The fifth group of optical signals indicates a multiply-add operation result of the input data and the first weight matrix and the second weight matrix.

With reference to the second aspect, in some implementations of the second aspect, the method further includes: A demultiplexing and recombination module demultiplexes and/or recombines the fifth group of optical signals to obtain a sixth group of optical signals. The sixth group of optical signals includes optical signals of Q wavelengths in the fifth group of optical signals. The sixth group of optical signals indicates output data, and Q is a positive integer less than or equal to N.

With reference to the second aspect, in some implementations of the second aspect, the method further includes: A multiplexing module modulates N parts of the input data into the N input optical signals, and multiplexes the N input optical signals into a same waveguide to form a seventh group of optical signals. A beam splitting module splits the seventh group of optical signals to form the first group of optical signals and the third group of optical signals.

With reference to the second aspect, in some implementations of the second aspect, the method further includes: A multiplexing module modulates N parts of the input data into the N input optical signals, and multiplexes the N input optical signals into a same waveguide to separately form the first group of optical signals and the third group of optical signals.

With reference to the second aspect, in some implementations of the second aspect, the method further includes: A loading and detection module splits the first weight matrix into N parts, and configures the N parts of the first weight matrix to be in one-to-one correspondence with N wavelengths. The loading and detection module splits the second weight matrix into N parts, and configures the N parts of the second weight matrix to be in one-to-one correspondence with N wavelengths. The loading and detection module separately loads the N first electric signals and the N second electric signals onto the operation module.

With reference to the second aspect, in some implementations of the second aspect, the method further includes: The loading and detection module transforms the input data into N parts, and configures the N parts of the input data to be in one-to-one correspondence with the N wavelengths. The loading and detection module loads the N parts of the input data onto the multiplexing module. The multiplexing module is configured to transmit the first group of optical signals and the third group of optical signals to the operation module.

With reference to the second aspect, in some implementations of the second aspect, the operation module includes N first modulators and N second modulators. That an operation module modulates a first group of optical signals based on N first electric signals to output a second group of optical signals includes: The N first modulators modulate the N input optical signals based on the N first electric signals to output the second group of optical signals. Wavelengths of optical signals modulated by the N first modulators are in one-to-one correspondence with the wavelengths of the N input optical signals. That the operation module modulates a third group of optical signals based on N second electric signals to output a fourth group of optical signals includes: The N second modulators modulate the N input optical signals based on the N second electric signals to output the fourth group of optical signals. Wavelengths of optical signals modulated by the N second modulators are in one-to-one correspondence with the wavelengths of the N input optical signals.

With reference to the second aspect, in some implementations of the second aspect, the operation module includes a first delay controller and a second delay controller. That the operation module adjusts delays and phases of the second group of optical signals and the fourth group of optical signals includes: The first delay controller adjusts the delay and the phase of the second group of optical signals. The second delay controller adjusts the delay and the phase of the fourth group of optical signals.

According to a third aspect, an optical computing apparatus is provided. The apparatus includes an operation module, configured to modulate a first group of optical signals based on N first electric signals to output a second group of optical signals. The first group of optical signals indicates input data. The first group of optical signals includes N input optical signals. Wavelengths of the N input optical signals are all different, where N is a positive integer greater than 2. Wavelengths of optical signals modulated by using the N first electric signals are in one-to-one correspondence with the wavelengths of the N input optical signals. The N first electric signals respectively indicate N first convolution kernels. The second group of optical signals indicates a calculation result of the input data and the N first convolution kernels.

The operation module is further configured to modulate a third group of optical signals based on N second electric signals to output a fourth group of optical signals. The third group of optical signals indicates the input data. The third group of optical signals includes the N input optical signals. Wavelengths of optical signals modulated by using the N second electric signals are in one-to-one correspondence with the wavelengths of the N input optical signals. The N second electric signals respectively indicate N second convolution kernels. The third group of optical signals indicates a calculation result of the input data and the N second convolution kernels.

The operation module is further configured to adjust delays and phases of the second group of optical signals and the fourth group of optical signals.

The apparatus includes a beam combining module, configured to combine an adjusted second group of optical signals and an adjusted fourth group of optical signals to output a fifth group of optical signals. The fifth group of optical signals indicates a multiply-add operation result of the input data and the N first convolution kernels and the N second convolution kernels.

According to this embodiment of this application, the wavelengths of the optical signals modulated by using the N first electric signals all correspond to the wavelengths of the N input optical signals, and each of the N first electric signals is used to modulate only an optical signal of one wavelength. Therefore, modulation performed by using the N first electric signals on the N input optical signals may be considered as parallel modulation between optical signals of N wavelengths, and modulation performed by using the N second electric signals on the N input optical signals may also be considered as parallel modulation between optical signals of N wavelengths. In addition, both the N first electric signals and the N second electric signals may implement modulation on the input data, in other words, modulation between the N first convolution kernels and the N second convolution kernels is also parallel. The optical computing apparatus combines parallel modulation results of the N first electric signals and the N second electric signals, to implement the multiply-add operation result of the input data and the N first convolution kernels and the N second convolution kernels. This helps improve a parallel computing capability of the optical computing apparatus.

Optionally, each of the N first electric signals is used to modulate one of the N input optical signals.

With reference to the third aspect, in some implementations of the third aspect, the apparatus further includes a demultiplexing and recombination module, configured to demultiplex and/or recombine the fifth group of optical signals to obtain a sixth group of optical signals. The sixth group of optical signals includes optical signals of Q wavelengths in the fifth group of optical signals. The sixth group of optical signals indicates output data, and Q is a positive integer less than or equal to N.

With reference to the third aspect, in some implementations of the third aspect, the apparatus further includes a multiplexing module, configured to modulate N parts of the input data into the N input optical signals, and multiplex the N input optical signals into a same waveguide to form a seventh group of optical signals. The apparatus includes a beam splitting module, configured to split the seventh group of optical signals to form the first group of optical signals and the third group of optical signals.

With reference to the third aspect, in some implementations of the third aspect, the apparatus further includes a multiplexing module, configured to modulate N parts of the input data into the N input optical signals, and multiplex the N input optical signals into a same waveguide to separately form the first group of optical signals and the third group of optical signals.

With reference to the third aspect, in some implementations of the third aspect, the apparatus further includes a loading and detection module, configured to: configure the N first convolution kernels to be in one-to-one correspondence with the N wavelengths; configure the N second convolution kernels to be in one-to-one correspondence with the N wavelengths; and separately load the N first electric signals and the N second electric signals onto the operation module.

With reference to the third aspect, in some implementations of the third aspect, the loading and detection module is further configured to: transform the input data into N parts, and configure the N parts of the input data to be in one-to-one correspondence with the N wavelengths; and load the N parts of the input data onto the multiplexing module, where the multiplexing module is configured to transmit the first group of optical signals and the third group of optical signals to the operation module.

With reference to the third aspect, in some implementations of the third aspect, the operation module includes N first modulators, configured to modulate the N input optical signals based on the N first electric signals. Wavelengths of optical signals modulated by the N first modulators are in one-to-one correspondence with the wavelengths of the N input optical signals. The operation module includes N second modulators, configured to modulate the N input optical signals based on the N second electric signals. Wavelengths of optical signals modulated by the N second modulators are in one-to-one correspondence with the wavelengths of the N input optical signals.

With reference to the third aspect, in some implementations of the third aspect, the operation module includes: a first delay controller, configured to adjust the delay and the phase of the second group of optical signals; and a second delay controller, configured to adjust the delay and the phase of the fourth group of optical signals.

With reference to the third aspect, in some implementations of the third aspect, the loading and detection module is further configured to receive the N first convolution kernels and the N second convolution kernels.

With reference to the third aspect, in some implementations of the third aspect, the loading and detection module is further configured to send configuration information to the multiplexing module and the demultiplexing and recombination module. The configuration information indicates the one-to-one correspondence between the N parts of the input data and the N wavelengths. The configuration information is used by the multiplexing module to modulate the N parts of the input data into the N input optical signals, and is used by the demultiplexing and recombination module to perform wavelength demultiplexing.

According to a fourth aspect, an optical computing system is provided, including any optical computing apparatus in the first aspect and some implementations of the first aspect, or including any optical computing apparatus in the third aspect and some implementations of the third aspect.

According to a fifth aspect, a computer-readable storage medium is provided. The computer-readable storage medium stores program code to be executed by a device, and the program code includes the method according to any one of the second aspect or the implementations of the second aspect.

According to a sixth aspect, a computer program product including instructions is provided; and when the computer program product runs on a computer, the computer is enabled to perform the method according to any one of the second aspect or the implementations of the second aspect.

DETAILED DESCRIPTION OF ILLUSTRATIVE EMBODIMENTS

The following describes the technical solutions of this application with reference to the accompanying drawings.

Figure 1:
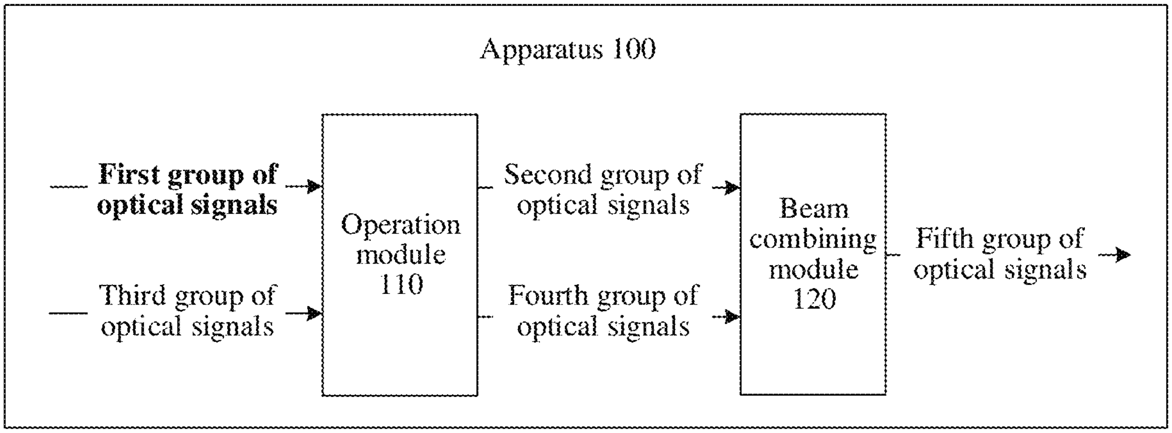
FIG. 1 is a schematic diagram of an optical computing apparatus according to an embodiment of this application.

FIG. 1 is a schematic diagram of an optical computing apparatus according to an embodiment of this application. As shown in FIG. 1, the apparatus 100 includes an operation module 110 and a beam combining module 120. For example, the apparatus 100 may be an optical computing chip.

The following describes the operation module 110 and the beam combining module 120 in detail.

In an embodiment scenario, the operation module 110 is configured to modulate a first group of optical signals based on N first electric signals to output a second group of optical signals. The first group of optical signals indicates input data. The first group of optical signals includes N input optical signals. Wavelengths of the N input optical signals are all different, where N is a positive integer greater than 2. Wavelengths of optical signals modulated by using the N first electric signals are in one-to-one correspondence with the wavelengths of the N input optical signals. The N first electric signals indicate N parts of a first weight matrix. The second group of optical signals indicates a calculation result of the input data and the first weight matrix.

In this application, the first group of optical signals indicates the input data, the first group of optical signals includes the N input optical signals, and the wavelengths of the N input optical signals are all different. In other words, the N input optical signals correspond to N wavelengths.

In an implementation, the input data is a vector.

In an implementation, the first weight matrix is a matrix including weights of a first neural network layer, and the second weight matrix is a matrix including weights of a second neural network layer.

The first weight matrix may be split into N parts. The N first electric signals each indicate one part of the first weight matrix, and each of the N first electric signals is separately used to modulate an optical signal of one wavelength. The wavelengths of the optical signals modulated by using the N first electric signals are in one-to-one correspondence with the wavelengths of the N input optical signals. For example, 10 first electric signals may be used to modulate optical signals of 10 wavelengths, including $\lambda_1$, $\lambda_2$, . . . $\lambda_{10}$, and correspondingly, there are also 10 input optical signals whose wavelengths are $\lambda_1$, $\lambda_2$, . . . $\lambda_{10}$ respectively.

The operation module 110 may receive the N first electric signals and the first group of optical signals, and modulate the first group of optical signals into the second group of optical signals based on the N first electric signals, to further output the second group of optical signals. Specifically, each first electric signal is used to modulate one of the N input optical signals. Therefore, the N first electric signals may implement parallel modulation of the N input optical signals, to output the second group of optical signals. It may be understood that the second group of optical signals also includes optical signals of N wavelengths. The second group of optical signals indicates a product operation result of the first weight matrix and the input data.

It should be noted that the wavelengths of the optical signals modulated by using the N first electric signals all correspond to the wavelengths of the N input optical signals, and each of the N first electric signals is used to modulate only an optical signal of one wavelength. Therefore, when an operation is performed on the input data and the first weight matrix, modulation performed by using the N first electric signals on the N input optical signals may be considered as parallel modulation between the optical signals of the N wavelengths.

The operation module 110 may be further configured to modulate a third group of optical signals based on N second electric signals to output a fourth group of optical signals. The third group of optical signals indicates the input data. The third group of optical signals includes the N input optical signals. Wavelengths of optical signals modulated by using the N second electric signals are in one-to-one correspondence with the wavelengths of the N input optical signals. The N second electric signals respectively indicate N parts of a second weight matrix. The third group of optical signals indicates a calculation result of the input data and the second weight matrix.

In this application, the third group of optical signals also indicates the input data, and the third group of optical signals also includes the foregoing N input optical signals.

Similarly, the second weight matrix may be split into N parts. The N second electric signals each indicate one part of the second weight matrix, and each of the N second electric signals is separately used to modulate an optical signal of one wavelength. The wavelengths of the optical signals modulated by using the N second electric signals are in one-to-one correspondence with the wavelengths of the N input optical signals. For example, optical signals of 10 wavelengths that may be modulated by using 10 second electric signals are also $\lambda_1$, $\lambda_2$ . . . $\lambda_{10}$.

The operation module 110 may further receive the N second electric signals and the third group of optical signals, and modulate the third group of optical signals into the fourth group of optical signals based on the N second electric signals, to further output the fourth group of optical signals. Specifically, each second electric signal is used to modulate one of the N input optical signals. Therefore, the N second electric signals may implement parallel modulation of the N input optical signals, to output the fourth group of optical signals. It may be understood that the fourth group of optical signals also includes optical signals of N wavelengths. The fourth group of optical signals indicates a product operation result of the second weight matrix and the input data.

Similarly, when an operation is performed on the input data and the second weight matrix, modulation performed by using the N second electric signals on the N input optical signals may be considered as parallel modulation between the optical signals of the N wavelengths.

It should be noted that, both the N first electric signals and the N second electric signals may implement modulation on the input data, and both the wavelengths of the optical signals modulated by using the N first electric signals and the wavelengths of the optical signals modulated by using the N second electric signals are in one-to-one correspondence with the wavelengths of the N input optical signals. Therefore, modulation between the N first electric signals and the N second electric signals may be considered as parallel modulation.

The operation module 110 is further configured to adjust delays and phases of the second group of optical signals and the fourth group of optical signals.

The operation module 110 may not only modulate the first group of optical signals to output the second group of optical signals, and modulate the third group of optical signals to output the fourth group of optical signals, but also adjust the delays and the phases of the second group of optical signals and the fourth group of optical signals.

In this application, the modulation of the optical signal in the operation module may be implemented by using a wavelength-sensitive electro-optic modulator (MD) such as a micro-ring modulator (MRM) or a Mach-Zehnder modulator (MZM), and the adjustment of the delays and the phases may be implemented via devices such as a delay waveguide and a phase shifter.

The beam combining module 120 may be configured to combine an adjusted second group of optical signals and an adjusted fourth group of optical signals to output a fifth group of optical signals. The fifth group of optical signals indicates a multiply-add operation result of the input data and the first weight matrix and the second weight matrix.

In this application, the beam combining module 120 may receive the adjusted second group of optical signals and the adjusted fourth group of optical signals, and combine the adjusted second group of optical signals and the adjusted fourth group of optical signals, to further output the fifth group of optical signals. The second group of optical signals indicates the product operation result of the first weight matrix and the input data. The fourth group of optical signals indicates the product operation result of the second weight matrix and the input data. The beam combining module 120 may implement summation of the adjusted second group of optical signals and the adjusted fourth group of optical signals. Therefore, the fifth group of optical signals indicates the result obtained by performing multiply-add operation on the input data and the second weight matrix and the first weight matrix.

It should be noted that the beam combining module 120 may implement summation of optical signals of wavelengths corresponding to the adjusted second group of optical signals and optical signals of wavelengths corresponding to the adjusted fourth group of optical signals. In other words, during beam combination, the optical signals of the wavelengths are independent of each other. Because the second group of optical signals and the fourth group of optical signals each include the optical signals of the N wavelengths, the fifth group of optical signals also includes optical signals of N wavelengths. In addition, an optical signal of each wavelength in the fifth group of optical signals is a summation result of an optical signal of the wavelength in the second group of optical signals and an optical signal of the wavelength in the fourth group of optical signals, and the optical signal of each wavelength in the fifth group of optical signals indicates a result of modulating an input optical signal of the wavelength by using a first electric signal and a second electric signal.

In this application, a function of the beam combining module may be implemented via a device having a beam combining function, for example, a beam splitter (for example, a Y-type beam splitter) or a directional coupler. Specifically, the beam combining function may be implemented via a reverse beam splitter.

According to this embodiment of this application, the wavelengths of the optical signals modulated by using the N first electric signals all correspond to the wavelengths of the N input optical signals, and each of the N first electric signals is used to modulate only an optical signal of one wavelength. Therefore, the modulation performed by using the N first electric signals on the N input optical signals may be considered as the parallel modulation between the optical signals of the N wavelengths, and the modulation performed by using the N second electric signals on the N input optical signals may also be considered as the parallel modulation between the optical signals of the N wavelengths. In addition, both the N first electric signals and the N second electric signals may implement modulation on the input data, in other words, modulation between the first weight matrix and the second weight matrix is also parallel. The optical computing apparatus combines parallel modulation results of the N first electric signals and the N second electric signals, to implement the multiply-add operation result of the input data and the first weight matrix and the second weight matrix. This helps improve a parallel computing capability of the optical computing apparatus.

Figure 2:
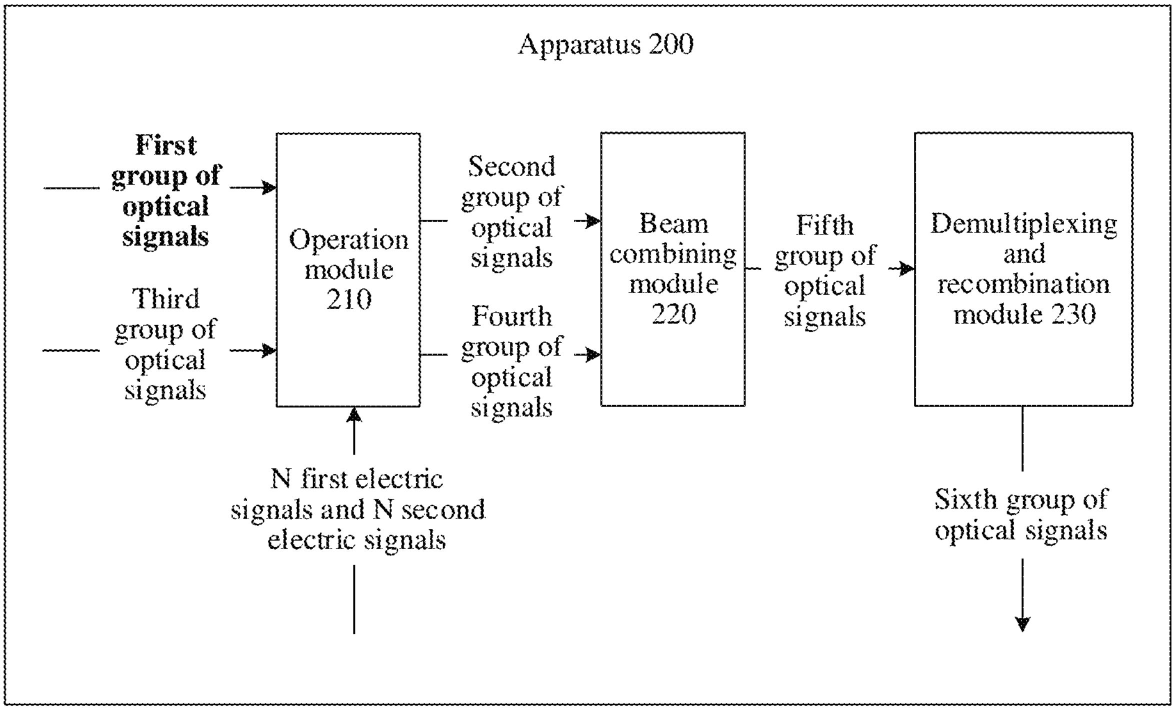
FIG. 2 is another schematic diagram of an optical computing apparatus according to an embodiment of this application.

FIG. 2 is another schematic diagram of an optical computing apparatus according to an embodiment of this application. As shown in FIG. 2, the apparatus 200 includes an operation module 210, a beam combining module 220, and a demultiplexing and recombination module 230. For functions implemented by the operation module 210 and the beam combining module 220, refer to the descriptions of the operation module 110 and the beam combining module 120 in the foregoing apparatus 100 respectively. Details are not described herein again.

The optical computing apparatus shown in FIG. 1 may further include a demultiplexing and recombination module 230. The demultiplexing and recombination module 230 may be configured to demultiplex and/or recombine the fifth group of optical signals to obtain a sixth group of optical signals. The sixth group of optical signals includes optical signals of Q wavelengths in the fifth group of optical signals. The sixth group of optical signals indicates output data, and Q is a positive integer less than or equal to N.

As shown in FIG. 2, the demultiplexing and recombination module 230 may separate optical carriers of various wavelengths. Specifically, the demultiplexing and recombination module 230 may be configured to receive a fifth group of optical signals from the beam combining module 220, and demultiplex the fifth group of optical signals to obtain N output optical signals, in other words, separate output optical signals of N wavelengths. Wavelengths of the N output optical signals are in one-to-one correspondence with wavelengths of N input optical signals. Further, the demultiplexing and recombination module 230 may be configured to select Q output optical signals from the N output optical signals to combine, to obtain a sixth group of optical signals. The sixth group of optical signal indicates output data. The demultiplexing and recombination module 230 may further output the sixth group of optical signals. In this case, a function of the demultiplexing and recombination module may be implemented by a device having a wavelength demultiplexing function and a device having an optical path selection function. For example, optical signals of N wavelengths may be first separated by using the device having the wavelength demultiplexing function, for example, an arrayed waveguide grating (AWG) or an etched diffraction grating (EDG), and then, the optical signals are recombined via the device having the optical path selection function, for example, an optical switch device or an optical router device. A wavelength selected by the optical switch device or the optical router device is configurable.

Alternatively, the demultiplexing and recombination module 230 may be configured to obtain a sixth group of optical signals from the fifth group of optical signals based on Q preset wavelength values. In this case, a function of the demultiplexing and recombination module may be implemented by a device having an optical path selection function. For example, a wavelength router is used to implement combination of optical signals of Q preset wavelengths. For example, a wavelength range is divided into two groups: A to B and B to C. $\lambda_1$ and $\lambda_2$ are within A to B, and $\lambda_3$ and $\lambda_4$ are within B to C.

Optionally, the Q preset wavelength values may be preconfigured in the demultiplexing and recombination module 230 based on a wavelength requirement of the output data. For example, the fifth group of optical signals includes optical signals of 10 wavelengths, and the demultiplexing and recombination module 230 may obtain a combination result of optical signals of 5 wavelengths in the optical signals of the 10 wavelengths.

In an implementation, the output data is a vector.

In this embodiment of this application, a multiply-add operation result of input data and a first weight matrix and a second weight matrix may be demultiplexed and/or recombined. Therefore, summation of optical signals of specific wavelengths can be implemented. For data processing, this manner is more flexible.

Figure 3:
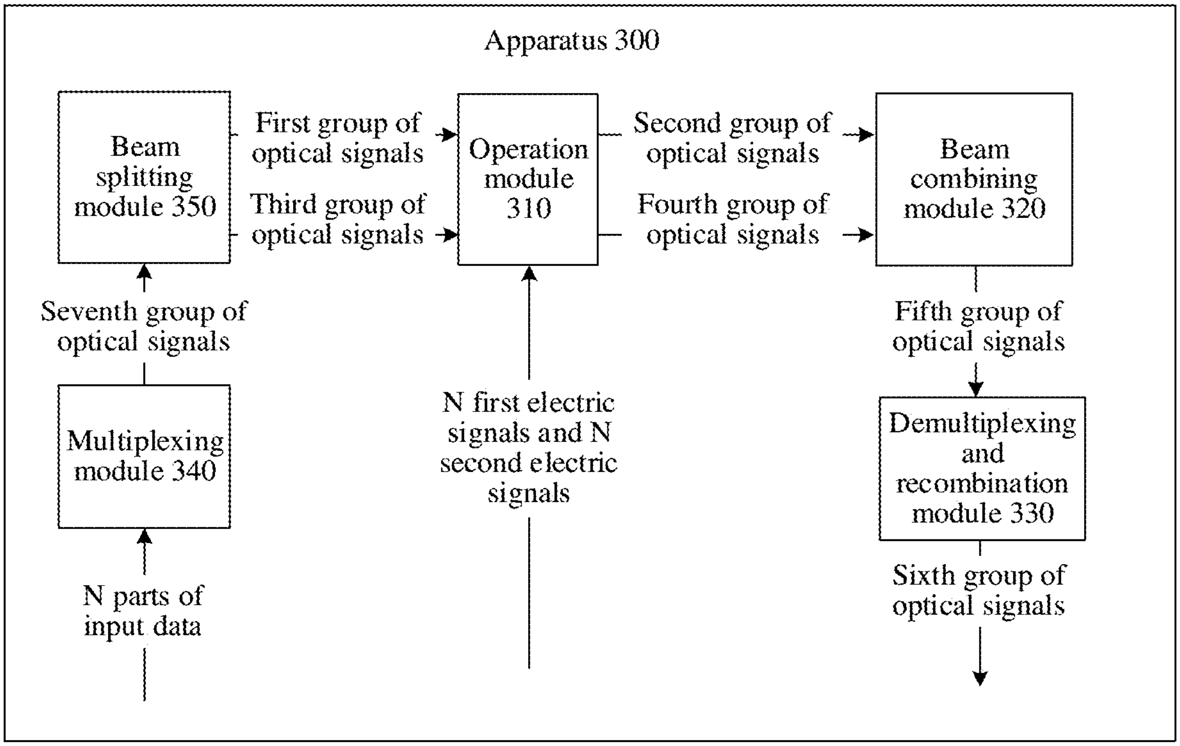
FIG. 3 is still another schematic diagram of an optical computing apparatus according to an embodiment of this application.

FIG. 3 is still another schematic diagram of an optical computing apparatus according to an embodiment of this application. As shown in FIG. 3, the apparatus 300 includes an operation module 310, a beam combining module 320, a demultiplexing and recombination module 330, a multiplexing module 340, and a beam splitting module 350. For functions implemented by the operation module 310, the beam combining module 320, and the demultiplexing and recombination module 330, refer to the descriptions of the operation module 110 and the beam combining module 120 in the apparatus 100 and the demultiplexing and recombination module 230 in the apparatus 200 respectively. Details are not described herein again.

The optical computing apparatuses shown in FIG. 1 and FIG. 2 each may include a multiplexing module 340 and a beam splitting module 350. The multiplexing module 340 may be configured to modulate N parts of the input data into the N input optical signals, and multiplex the N input optical signals into a same waveguide to form a seventh group of optical signals. The beam splitting module 350 may be configured to split the seventh group of optical signals to form the first group of optical signals and the third group of optical signals.

As shown in FIG. 3, the multiplexing module 340 may receive N parts of input data, and modulate the N parts of the input data into N input optical signals based on wavelengths corresponding to the N parts of the input data. Wavelengths of the N input optical signals are the wavelengths corresponding to the N parts of the input data. The N input optical signals respectively indicate the N parts of the input data, in other words, the N input optical signals indicate the input data. Further, the multiplexing module 340 may multiplex the N input optical signals into a same waveguide to form a seventh group of optical signals, and then output the seventh group of optical signals to the beam splitting module 350. The seventh group of optical signals indicates the input data, and the seventh group of optical signals includes the N input optical signals.

The beam splitting module 350 may split a group of optical signals into two groups of optical signals that are the same as the group of optical signals before splitting. Specifically, the beam splitting module 350 may receive the seventh group of optical signals, and split the seventh group of optical signals to form a first group of optical signals and a third group of optical signals. Then, the first group of optical signals and the third group of optical signals are separately output to the operation module 310 through one channel (or waveguide).

Therefore, in this embodiment of this application, the input data can be modulated into optical signals of a plurality of wavelengths, the optical signals of the plurality of wavelengths are multiplexed into a same waveguide, and the seventh group of optical signals that indicate the input data is split into a plurality of beams, so that the operation module can separately perform operation processing on the plurality of beams of optical signals, and optical signals of a plurality of wavelengths in each beam can also be separately processed. This helps improve a parallel processing capability of a system.

In this application, a function of the multiplexing module may be implemented by using a device having a wavelength multiplexing function, for example, an AWG or an EDG. A specific function of the beam splitting module may be implemented via a device having a beam splitting function, for example, a beam splitter (for example, a Y-type beam splitter) or a directional coupler. Any device that can split one path of optical signals into two paths of same optical signals is applicable to this embodiment of this application.

Figure 4:
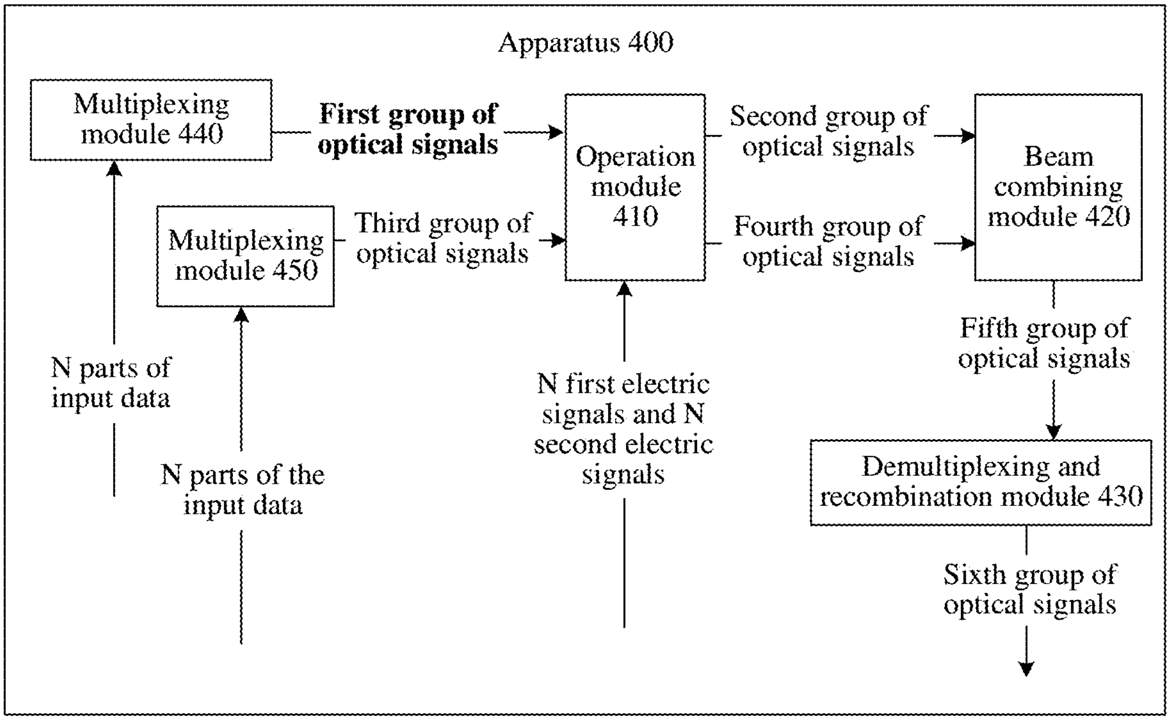
FIG. 4 is still another schematic diagram of an optical computing apparatus according to an embodiment of this application.

FIG. 4 is still another schematic diagram of an optical computing apparatus according to an embodiment of this application. As shown in FIG. 4, the apparatus 400 includes an operation module 410, a beam combining module 420, a demultiplexing and recombination module 430, a multiplexing module 440, and a multiplexing module 450. For functions implemented by the operation module 410, the beam combining module 420, and the demultiplexing and recombination module 430, refer to the descriptions of the operation module 110 and the beam combining module 120 in the apparatus 100 and the demultiplexing and recombination module 230 in the apparatus 200 respectively. Details are not described herein again.

The optical computing apparatuses shown in FIG. 1 and FIG. 2 each may include a multiplexing module 440 and a multiplexing module 450. The multiplexing module 440 may be configured to modulate N parts of the input data into the N input optical signals, and multiplex the N input optical signals into a same waveguide to form the first group of optical signals. Similarly, the multiplexing module 450 may also be configured to modulate the N parts of the input data into the N input optical signals, and multiplex the N input optical signals into a same waveguide to form the third group of optical signals.

As shown in FIG. 4, similar to the multiplexing module 340 in the apparatus 300, the multiplexing module 440 may also receive N parts of input data, and modulate the N parts of the input data into N input optical signals based on wavelengths corresponding to the N parts of the input data. Wavelengths of the N input optical signals are the wavelengths corresponding to the N parts of the input data. The N input optical signals respectively indicate the N parts of the input data, in other words, the N input optical signals indicate the input data. Further, the multiplexing module 440 may multiplex the N input optical signals into a same waveguide to form a seventh group of optical signals, and the multiplexing module 440 may use the formed seventh group of optical signals as a first group of optical signals and output the first group of optical signals to the operation module 410. Similarly, the multiplexing module 450 may use the formed seventh group of optical signals as a third group of optical signals and output the third group of optical signals to the operation module 410. The seventh group of optical signals indicates the input data, and the seventh group of optical signals includes the N input optical signals.

In other words, the first group of optical signals and the third group of optical signals may be two groups of optical signals formed after a beam splitter splits the seventh group of optical signals that indicate the input data and include input optical signals of a plurality of wavelengths, or both the first group of optical signals and the third group of optical signals may be the seventh group of optical signals.

In this application, a function of the multiplexing module may be implemented by using a device having a wavelength multiplexing function, for example, an AWG or an EDG.

Figure 5:
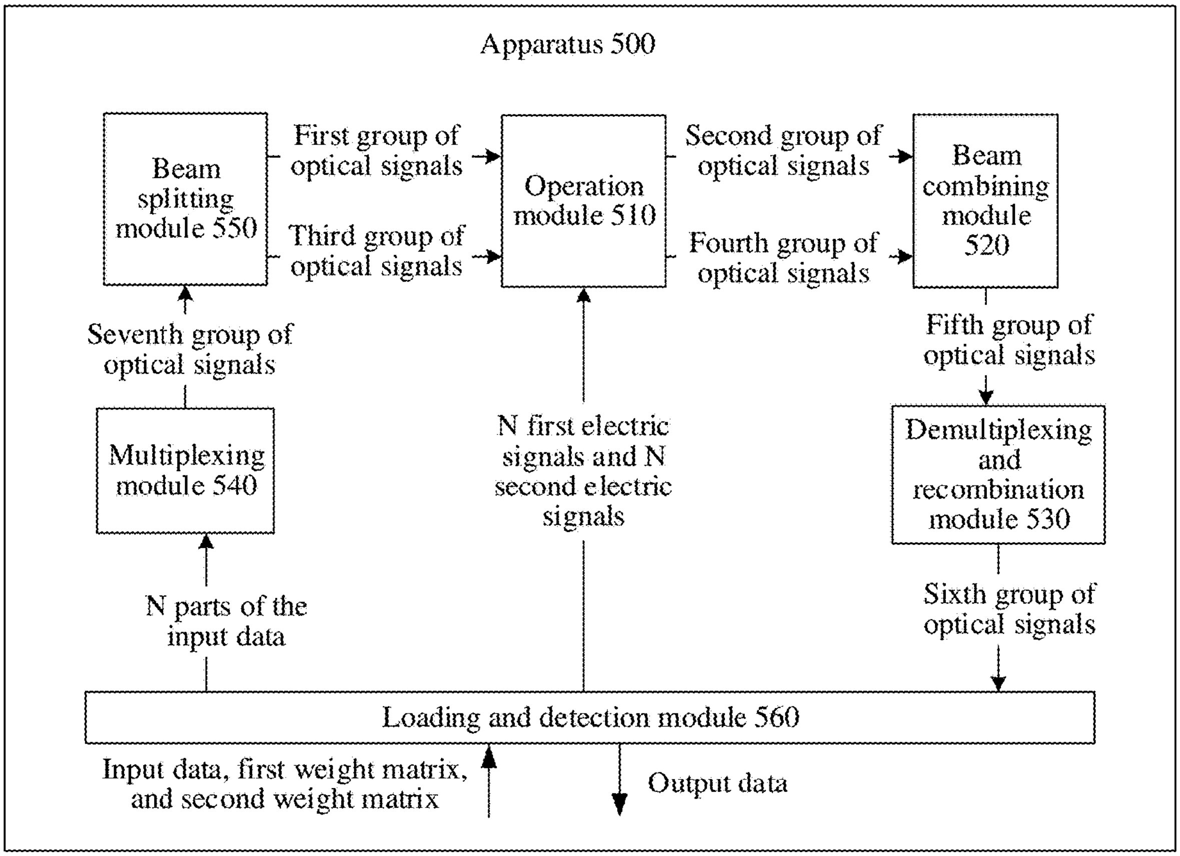
FIG. 5 is still another schematic diagram of an optical computing apparatus according to an embodiment of this application.

FIG. 5 is still another schematic diagram of an optical computing apparatus according to an embodiment of this application. As shown in FIG. 5, the apparatus 500 includes an operation module 510, a beam combining module 520, a demultiplexing and recombination module 530, a multiplexing module 540, a beam splitting module 550, and a loading and detection module 560. For functions implemented by the operation module 510, the beam combining module 520, the demultiplexing and recombination module 530, the multiplexing module 540, and the beam splitting module 550, refer to the descriptions of the operation module 110 and the beam combining module 120 in the apparatus 100, the demultiplexing and recombination module 230 in the apparatus 200, and the multiplexing module 340 and the beam splitting module 350 in the apparatus 300 respectively. Details are not described herein again.

The optical computing apparatuses shown in FIG. 1 to FIG. 4 each may include a loading and detection module 560. The loading and detection module 560 is configured to: split the first weight matrix into N parts, and configure the N parts of the first weight matrix to be in one-to-one correspondence with the N wavelengths; and split the second weight matrix into N parts, and configure the N parts of the second weight matrix to be in one-to-one correspondence with the N wavelengths.

In this application, a value of N may be determined based on a quantity of wavelengths that can be modulated by an operation module. The loading and detection module 560 may obtain parameters of the operation module, including a size of the operation module, in other words, the quantity of wavelengths that can be modulated by the operation module, to determine the value of N. Optionally, the value of N may be less than or equal to the quantity of wavelengths that can be modulated by the operation module. For example, if the quantity of wavelengths that can be modulated by the operation module is 20, including $\lambda_1, \lambda_2, \ldots \lambda_{20}$, the input data is transformed into 20 parts or fewer than 20 parts.

As shown in FIG. 5, the loading and detection module 560 may receive a first weight matrix and split the first weight matrix into N parts. For example, the first weight matrix is a y*x matrix, and each of the N parts of the first weight matrix may include y rows and A columns, or each of the N parts of the first weight matrix may include B rows and x columns. It should be understood that, when the first weight matrix is split by column, a quantity of columns of the first weight matrix may be supplemented to a multiple of N, and redundant data is filled with o, where a quantity of columns obtained through supplementation is denoted as x', and A=x'/N. When the first weight matrix is split by row, a quantity of rows of the first weight matrix may be supplemented to a multiple of N, and redundant data is filled with o, where a quantity of rows obtained through supplementation is denoted as y', and B=y'/N.

The loading and detection module 560 may further configure the N parts of the first weight matrix to be in one-to-one correspondence with N wavelengths. For example, if wavelengths that can be modulated by the operation module are $\lambda_1, \lambda_2, \ldots \lambda_{20}$, a correspondence between 20 parts of the first weight matrix and $\lambda_1, \lambda_2, \ldots, \lambda_{20}$ is configured.

Similarly, the loading and detection module 560 may also receive a second weight matrix, and perform similar splitting and configuration on the second weight matrix.

In an implementation, the loading and detection module 560 may be further configured to separately load N first electric signals and N second electric signals onto the operation module.

As shown in FIG. 5, the loading and detection module 560 may load the N first electric signals onto the operation module 510, in other words, send the N first electric signals to the operation module 510. The N first electric signals indicate the N parts of the first weight matrix.

Similarly, the optical computing apparatus 100 shown in FIG. 1 may also include the loading and detection module 560. The loading and detection module 560 may load the N parts of the first weight matrix and the N parts of the second weight matrix onto the operation module 110.

Therefore, in this embodiment of this application, a loading and detection module may split a weight matrix into N parts based on the wavelengths that can be modulated by the operation module, and each part corresponds to one wavelength. In other words, in this application, parallelism of a system can be improved through wavelength multiplexing, and operation complexity of the system can also be reduced.

In an implementation, the loading and detection module 560 may be further configured to transform the input data into N parts, and configure the N parts of the input data to be in one-to-one correspondence with the N wavelengths.

As shown in FIG. 5, the loading and detection module 560 may receive the input data and transform the input data into N parts. Specifically, that the input data is transformed into N parts may be that each of the N parts is the same as the input data, in other words, the input data is replicated into N pieces. Alternatively, each of the N parts includes a part of the input data, and the N parts are different from each other, in other words, the input data is split into N parts. This is not limited in this embodiment of this application. For example, the input data is a vector X of x rows, and each of the N parts of the input data may include x/N rows, or each part includes x rows that are the same as the input data. When the input data is split, a quantity of rows of the input data may be supplemented to a multiple of N, and redundant data is filled with 0.

The loading and detection module 560 may further configure the N parts of the input data to be in one-to-one correspondence with the N wavelengths. For example, if the wavelengths that can be modulated by the operation module are $\lambda_1, \lambda_2, \ldots \lambda_{20}$, a one-to-one correspondence between the 20 parts of the input data and $\lambda_1, \lambda_2, \ldots \lambda_{20}$ is configured.

In an implementation, the loading and detection module 560 may be further configured to load the N parts of the input data onto a multiplexing module. The multiplexing module is configured to transmit the first group of optical signals and the third group of optical signals to the operation module.

As shown in FIG. 5, the loading and detection module 560 may load the N parts of the input data onto a corresponding wavelength in the multiplexing module 540, in other words, send the N parts of the input data to the multiplexing module 540. The multiplexing module 540 may be configured to transmit the first group of optical signals and the third group of optical signals to the operation module.

Similarly, the optical computing apparatus 400 shown in FIG. 4 may also include the loading and detection module 560. The loading and detection module 560 may separately load the N parts of the input data onto corresponding wavelengths in the multiplexing module 440 and the multiplexing module 450, in other words, send the N parts of the input data to the multiplexing module 440 and the multiplexing module 450. The multiplexing module 440 may be configured to transmit the first group of optical signals to the operation module, and the multiplexing module 450 may be configured to transmit the third group of optical signals to the operation module.

Therefore, in this embodiment of this application, the loading and detection module may transform the input data into N parts based on the wavelengths that can be modulated by the operation module, and each input part corresponds to one wavelength. In other words, in this application, the parallelism of the system can be improved through the wavelength multiplexing, and the operation complexity of the system can also be reduced.

In an implementation, in the apparatus 500 shown in FIG. 5, the loading and detection module 560 may be further configured to detect a sixth group of optical signals from the demultiplexing and recombination module 530, to obtain output data.

The loading and detection module 560 may convert an optical signal into an electric signal, and therefore may detect the sixth group of optical signals and obtain a calculation result.

In an implementation, in the apparatus 500 shown in FIG. 5, the loading and detection module 560 may be further configured to output configuration information to the multiplexing module and the demultiplexing and recombination module. The configuration information indicates the one-to-one correspondence between the N parts of the input data and the N wavelengths. The configuration information is used by the multiplexing module to modulate the N parts of the input data into N input optical signals, and is used by the demultiplexing and recombination module to perform wavelength demultiplexing.

In this application, a function of the loading and detection module may be implemented by a photoelectric detector and an electric processor. The electric processor may be a central processing unit (CPU), another general-purpose processor, a microprocessor, an application-specific integrated circuit (ASIC), a field programmable gate array (FPGA), a digital signal processor (DSP), or one or more integrated circuits configured to control implementation of the function in this application.

Figure 6:
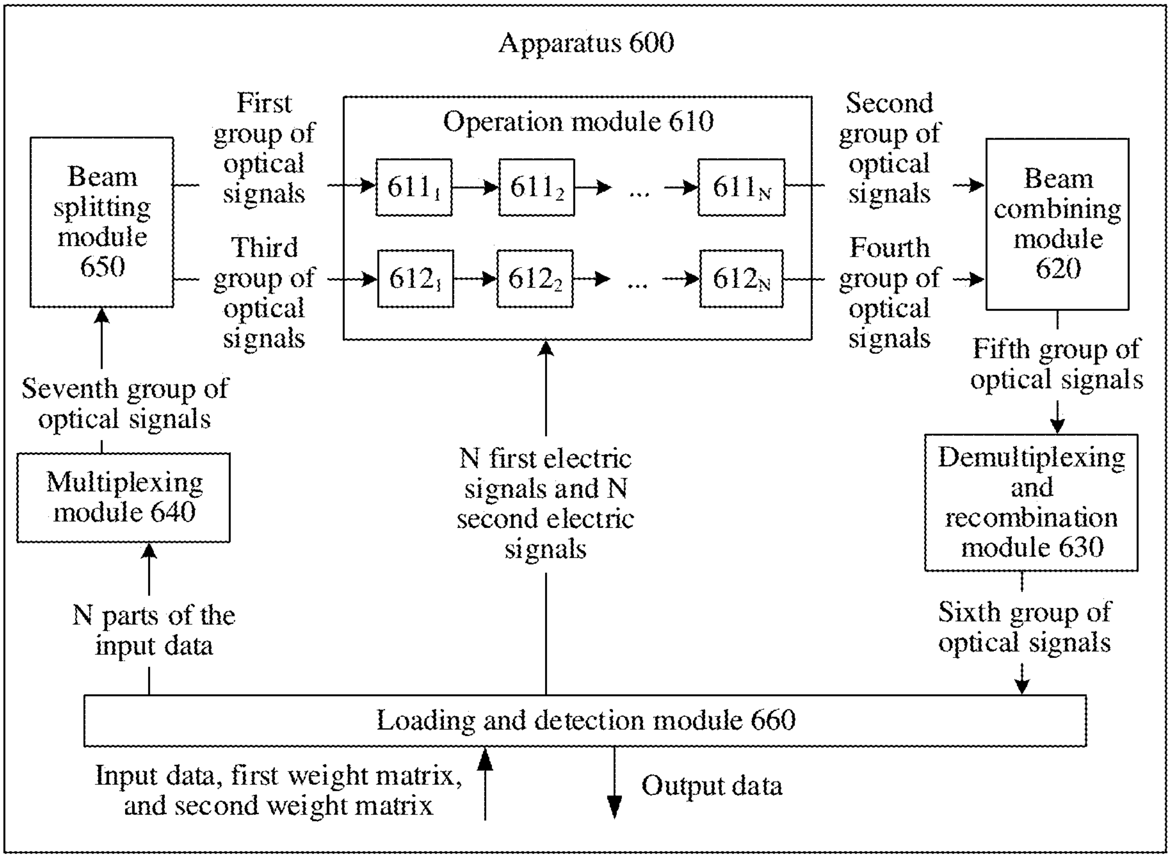
FIG. 6 is still another schematic diagram of an optical computing apparatus according to an embodiment of this application.

FIG. 6 is still another schematic diagram of an optical computing apparatus according to an embodiment of this application. As shown in FIG. 6, the apparatus 600 includes an operation module 610, a beam combining module 620, a demultiplexing and recombination module 630, a multiplexing module 640, a beam splitting module 650, and a loading and detection module 660. The operation module 610 includes N first modulators 611 and N second modulators 612. For functions implemented by the operation module 610, the beam combining module 620, the demultiplexing and recombination module 630, the multiplexing module 640, the beam splitting module 650, and the loading and detection module 660, refer to the descriptions of the operation module 110 and the beam combining module 120 in the apparatus 100, the demultiplexing and recombination module 230 in the apparatus 200, the multiplexing module 340 and the beam splitting module 350 in the apparatus 300, and the loading and detection module 560 in the apparatus 500 respectively. Details are not described herein again.

As shown in FIG. 6, the N first modulators 611 are configured to modulate N input optical signals based on N first electric signals. Wavelengths of optical signals modulated by the N first modulators 611 are in one-to-one correspondence with wavelengths of the N input optical signals. The N second modulators 612 are configured to modulate the N input optical signals based on N second electric signals. Wavelengths of optical signals modulated by the N second modulators 612 are in one-to-one correspondence with the wavelengths of the N input optical signals.

Specifically, each of the N first modulators 611 may receive one first electric signal, and then each of the N first modulators 611 may modulate an input optical signal of a corresponding wavelength by using the received first electric signal. N wavelengths of the optical signals modulated by using the N first electric signals are N wavelengths that can be modulated by the N first modulators 611. One first modulator 611 modulates an optical signal of one wavelength, and has no modulation effect on an optical signal of another wavelength.

Similarly, each of the N second modulators 612 may receive one second electric signal, and then each of the N second modulators 612 may modulate an input optical signal of a corresponding wavelength by using the received second electric signal. N wavelengths of the optical signals modulated by using the N second electric signals are N wavelengths that can be modulated by the N second modulators 612. One second modulator 612 modulates an optical signal of one wavelength, and has no modulation effect on an optical signal of another wavelength.

In an example, it is assumed that a modulator #1 is configured to modulate an optical signal whose wavelength is $\lambda_1$. The modulator #1 may be considered as an example of the first modulator 611, or may be considered as an example of the second modulator 612. It may be understood that when an optical signal #1 whose wavelength is $\lambda_1$ passes through the modulator #1, the modulator #1 may load stored data d onto the optical signal whose wavelength is $\lambda_1$, to output an optical signal #2. The optical signal #2 includes information about the data d. After an optical signal #3 whose wavelength is $\lambda_2$ passes through the modulator #1, the optical signal #3 is still output.

When a first group of optical signals successively passes through the N first modulators 611, each of the N first modulators 611 may modulate an optical signal of one wavelength in the first group of optical signals, and optical signals of wavelengths that are not modulated by the modulator continue to flow to a next modulator. Therefore, modulation between the N first modulators 611 may be considered as parallel modulation, in other words, multi-wavelength parallel modulation. For example, it is assumed that the modulator #1 is configured to modulate the optical signal whose wavelength is $\lambda_1$, and a modulator #2 is configured to modulate an optical signal whose wavelength is $\lambda_2$. The modulator #1 and the modulator #2 may be considered as two examples of the first modulator 611, where a value of N is 2. It is assumed that the first group of optical signals includes the optical signal #1 and the optical signal #2, and wavelengths of the optical signal #1 and the optical signal #2 are $\lambda_1$ and $\lambda_2$ respectively. When the first group of optical signals successively flows through the modulator #1 and the modulator #2, the modulator #1 may modulate the optical signal #1. In a modulation process of the modulator #1, the optical signal #2 continues to flow to the modulator #2, and then the modulator #2 may modulate the optical signal #2. Therefore, modulation between the optical signals of the two wavelengths may be considered as parallel modulation.

Similarly, when the first group of optical signals successively passes through the N second modulators 612, each of the N second modulators 612 may also modulate an optical signal of one wavelength in the first group of optical signals, to implement parallel modulation between the N second modulators 612.

Further, both the N first modulators 611 and the N second modulators 612 may be considered as a modulation channel, or may be considered as a group of modulators. In this application, input data may be indicated by using a plurality of groups of optical signals, including the first group of optical signals and a third group of optical signals, and then each group of optical signals is transmitted as input to N modulators (for example, the N first modulators 611, and for another example, the N second modulators 612) of the operation module 610 for modulation, to implement parallel modulation of a plurality of groups of modulators.

Therefore, in this embodiment of this application, multi-wavelength and multi-channel parallel modulation can be performed on the input data, to improve computing power of the optical computing apparatus.

It should be understood that the plurality of groups of modulators in this application may be considered as a plurality of modulator arrays. In other words, N single-wavelength modulators form one modulator array in units of modulation channels. For example, the N first modulators 611 in FIG. 6 form one modulator array. Alternatively, in an implementation, modulators that adjust a same wavelength may be used as a modulator array in a unit of wavelengths. For example, N modulator arrays are included in FIG. 6. Alternatively, in an implementation, all modulators are considered as a modulator array.

In a possible implementation, the modulator in the modulator array may be an electro-optic modulator such as an MRM or an MZM.

In the optical computing apparatus 600 shown in FIG. 6, the loading and detection module 660 is specifically configured to load the N first electric signals onto the N first modulators 611 respectively based on wavelengths corresponding to the N first electric signals. A wavelength modulated by each first modulator is the same as a wavelength configured by the loading and detection module 660 for each first electric signal. The N second electric signals are loaded onto the N second modulators 612 respectively based on wavelengths corresponding to the N second electric signals. A wavelength modulated by each second modulator is the same as a wavelength configured by the loading and detection module 660 for each second electric signal.

Figure 7:
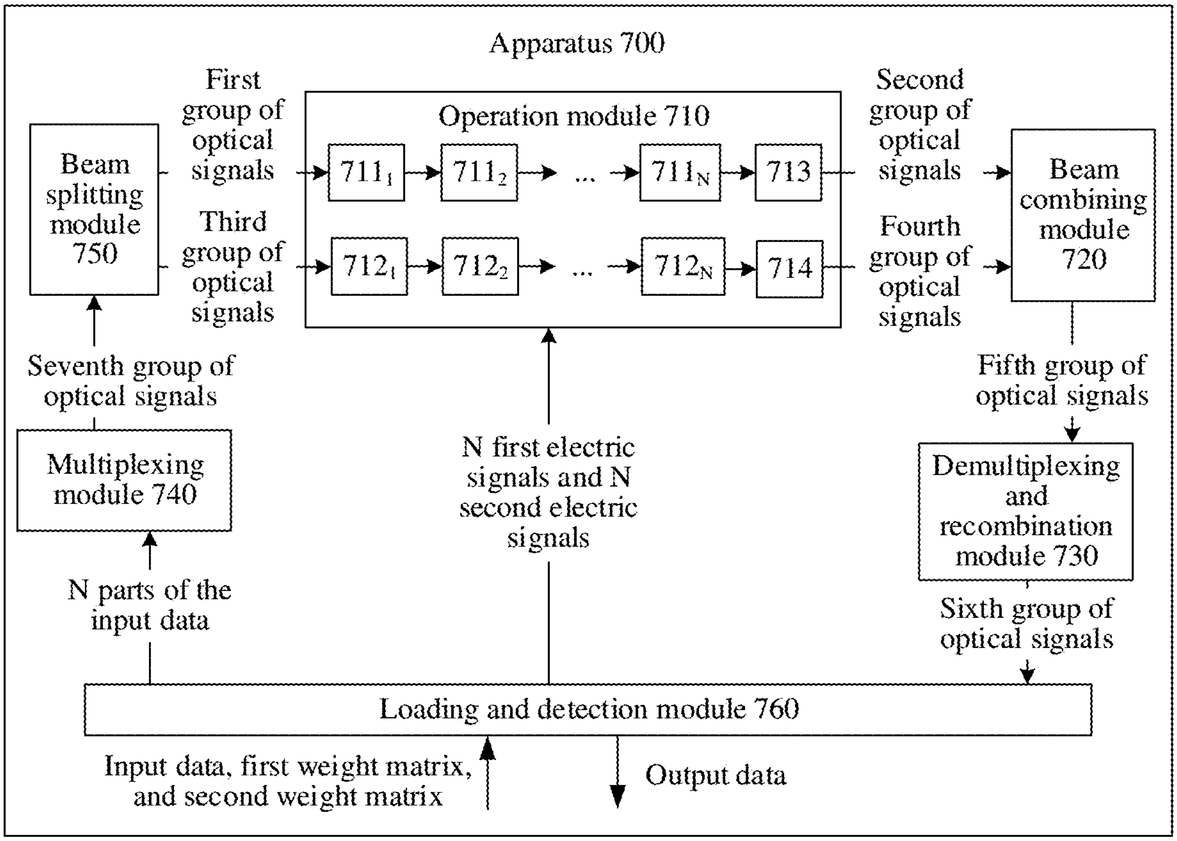
FIG. 7 is still another schematic diagram of an optical computing apparatus according to an embodiment of this application.

FIG. 7 is still another schematic diagram of an optical computing apparatus according to an embodiment of this application. As shown in FIG. 7, the apparatus 700 includes an operation module 710, a beam combining module 720, a demultiplexing and recombination module 730, a multiplexing module 740, a beam splitting module 750, and a loading and detection module 760. The operation module 710 includes N first modulators 711, N second modulators 712, a first delay controller 713, and a second delay controller 714. For functions implemented by the operation module 710, the beam combining module 720, the demultiplexing and recombination module 730, the multiplexing module 740, the beam splitting module 750, and the loading and detection module 760, refer to the descriptions of the operation module 110 and the beam combining module 120 in the apparatus 100, the demultiplexing and recombination module 230 in the apparatus 200, the multiplexing module 340 and the beam splitting module 350 in the apparatus 300, and the loading and detection module 560 in the apparatus 500 respectively. For functions implemented by the N first modulators 711 and the N second modulators 712, refer to the descriptions of the N first modulators 611 and the N second modulators 612 in the apparatus 600. Details are not described herein again.

As shown in FIG. 7, the first delay controller 713 is configured to adjust a delay and a phase of a second group of optical signals, and the second delay controller 714 is configured to adjust a delay and a phase of a fourth group of optical signals.

Specifically, output of each group of modulators may be connected to a delay controller, to implement adjustment of a delay and a phase of an output optical signal of a modulator. The first delay controller 713 may be configured to adjust the delay and the phase of the second group of optical signals, and the second delay controller 714 may be configured to adjust the delay and the phase of the fourth group of optical signals.

The first delay controller 713 and the second delay controller 714 may form a delay control array. The first delay controller 713 and the second delay controller 714 each include a delay waveguide and a phase shifter. The delay waveguide is configured to adjust the delay of the output optical signal of the modulator. In other words, different delays may be respectively allocated to optical signals on different channels, so that effective optical path lengths of the channels are equal, thereby implementing staggered addition of signals. The phase shifter may also be referred to as a phaser, can adjust a phase of a wave, and therefore may be configured to adjust a phase of an optical signal on each channel, to enable an effect generated when the optical signals on the different channels is combined to be approximate to an effect of addition.

In this embodiment of this application, the delay and the phase of the optical signal can be adjusted, to enable the effect generated when the optical signals on the different channels are combined to be approximate to the effect of addition. This helps improve an effect of optical computing.

In an implementation, second input data is a multiply-add operation result of input data and a first weight matrix and a second weight matrix.

In other words, in this application, the multiply-add operation result of the input data and the first weight matrix and the second weight matrix may be used as input data again, to implement an iterative operation.

In another embodiment scenario, the N first electric signals in the foregoing apparatuses 100 to 700 indicate N first convolution kernels, and the second group of optical signals indicates a calculation result of the input data and the N first convolution kernels. The N second electric signals indicate N second convolution kernels, the fourth group of optical signals indicates a calculation result of the input data and the N second convolution kernels, and the fifth group of optical signals indicates a multiply-add operation result of the input data and the N first convolution kernels and the N second convolution kernels. A loading and detection module may be adapted to configure the N first convolution kernels to be in one-to-one correspondence with N wavelengths, and configure the N second convolution kernels to be in one-to-one correspondence with N wavelengths.

Optionally, the loading and detection module may be further configured to receive the N first convolution kernels and N second convolution kernels. Each of the N first convolution kernels may be considered as a first electric signal, and each of second N convolution kernels may be considered as a second electric signal.

In other words, the optical computing apparatuses 100 to 700 in this application can not only implement the multiply-add operation result of the input data and the first weight matrix and the second weight matrix, but also implement the multiply-add operation result of the input data and the N first convolution kernels and the N second convolution kernels.

A neural network model, for example, a convolutional neural network (CNN), includes a convolutional layer and a fully connected layer, usually needs to perform a large quantity of data operations, and needs to store a large amount of process data in a data operation process. To increase an operation speed of the neural network model, an optical computing system may be used to implement the data operation process of the neural network model, to obtain a final operation result. For the optical computing apparatus provided above, the following describes operation processes performed by the optical computing apparatus at the fully connected layer and the convolutional layer.

1. Fully Connected Layer

To implement an operation at the fully connected layer, the optical computing apparatus may be used to implement a multiply-add operation. The optical computing apparatus may receive the input data, the first weight matrix, and the second weight matrix. For ease of description, the input data is represented by a vector X herein, the first weight matrix is represented by $W_1$, and the second weight matrix is represented by $W_2$. A size of the vector X is x*1, in other words, the vector X includes x rows and one column. A size of the matrix $W_1$ is y*x, in other words, the matrix W, includes y rows and x columns. A size of the matrix $W_2$ is y*x, in other words, the matrix $W_2$ includes y rows and x columns. Output data is represented by a vector Y. Therefore, a size of the vector Y is y*1. Each of the x rows of the input data may be considered as one piece of data, in other words, the input data includes x pieces of data. In other words, a length of the input data is x, and a length of the output data is y. A quantity of wavelengths that can be modulated by an operation module is N, and the wavelengths are respectively denoted as $\lambda_1, \lambda_2, \lambda_3, \ldots, \lambda_N$.

To implement a multiply-add operation of the input data X and the first weight matrix $W_1$ and the second weight matrix $W_2$, the input data X, the first weight matrix $W_1$, and the second weight matrix $W_2$ may be separately input into the optical computing apparatus. The loading and detection module (for example, the loading and detection module 760) in the optical computing apparatus (for example, the apparatus 700) may split the matrix W, and the matrix $W_2$ both into N computing parts, and transform the vector X into N input parts. Based on a value relationship between the length of the input data and the length of the output data, a computing process at the fully connected layer may be described in the following two cases.

Case 1: The length of the input data is greater than the length of the output data, in other words, x is greater than y.

Figure 8:
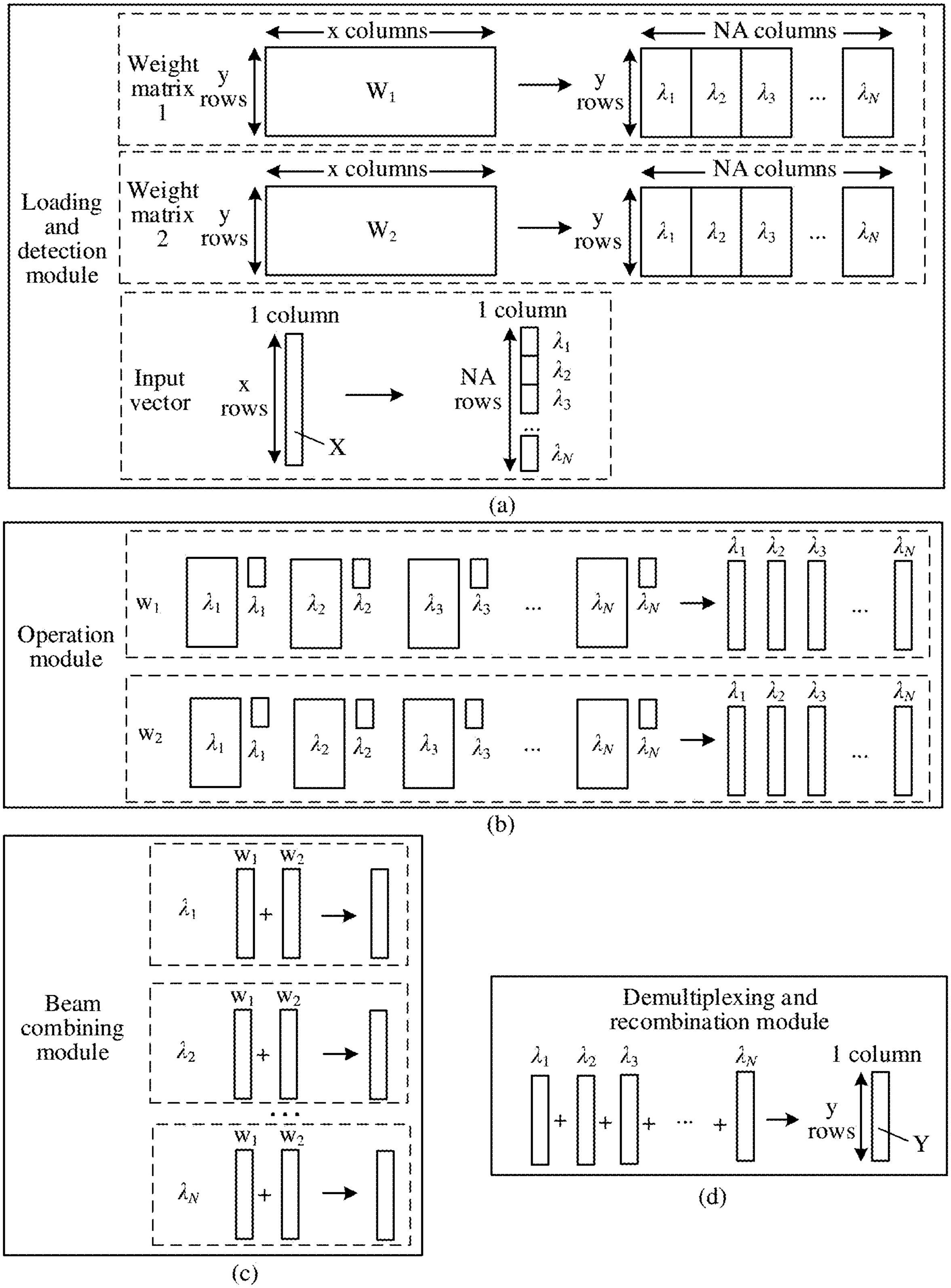
FIG. 8 is a schematic diagram of a data operation process at a fully connected layer according to an embodiment of this application.

FIG. 8 is a schematic diagram of a data operation process at a fully connected layer according to an embodiment of this application. As shown in (a) in FIG. 8, if a length of input data is greater than a length of output data, a loading and detection module may split a matrix $W_1$ and a matrix $W_2$ both into N computing parts in a unit of A columns. If x cannot be exactly divided by N, rows for supplementation are filled with o, in other words, zero-padding is performed on redundant data. A quantity of columns obtained through supplementation is denoted as x', and A=x'/N. To be specific, each of the N computing parts of the matrix $W_1$ and each of the N computing parts of the matrix $W_2$ both include y rows and A columns, and a wavelength is allocated to each computing part based on wavelengths that can be modulated by an operation module, in other words, wavelengths corresponding to the computing parts of the matrix $W_1$ are $\lambda_1$, $\lambda_2, \lambda_3, \ldots, \lambda_N$ respectively, and the same is true for the matrix $W_2$. Further, the loading and detection module may split a vector X into N parts, in other words, each of the N parts is a vector of A*1. If x cannot be exactly divided by N, rows for supplementation are filled with 0, and a quantity of rows obtained through supplementation is denoted as x', where A=x'/N. It should be understood that the vector X is split into N parts, and each part includes A rows. In other words, the vector X is split into N input parts in a unit of A rows, and a corresponding wavelength is allocated to each of the N input parts based on the wavelengths allocated to the N computing parts, that is, the wavelengths corresponding to the input parts are $\lambda_1, \lambda_2, \lambda_3, \ldots, \lambda_N$ respectively.

In a computing process shown in (a) in FIG. 8, there are two weight matrices. Therefore, the operation module includes two groups of modulators, every N modulators are grouped into one group, in other words, 2N modulators are included, and every N modulators correspondingly modulate optical signals whose wavelengths are $\lambda_1, \lambda_2, \lambda_3, \ldots \lambda_N$ respectively. The loading and detection module may separately load the N computing parts of the first weight matrix onto wavelengths corresponding to a first group of modulators of the operation module, and separately load the N computing parts of the second weight matrix onto wavelengths corresponding to a second group of modulators of the operation module. Further, the loading and detection module separately loads the N input parts onto wavelengths corresponding to a multiplexing module. The N input parts pass through the multiplexing module (for example, the multiplexing module 740) and a beam splitting module (for example, the beam splitting module 750), or pass through two multiplexing modules (for example, the multiplexing modules 440 and 450) to form two paths of optical signals and separately input the two paths of optical signals to the operation module (for example, a operation module 710), where each path of optical signals includes optical signals of N wavelengths.

As shown in (b) in FIG. 8, in the operation module, each path of optical signals passes through N modulators, and each of the N modulators modulates an optical signal of one wavelength. In other words, the modulator may modulate, to an optical signal of a corresponding wavelength, a computing part loaded by the loading and detection module, to implement a multiplication operation of the computing part corresponding to the wavelength and an input part corresponding to the wavelength. In each waveguide (or referred to as each channel or each group of modulators) of the operation module, the optical signals of the N wavelengths pass through the N modulators, and output results of the N wavelengths are output. An output result of each wavelength is a product operation result of a computing part of the wavelength and an input part of the wavelength. Optionally, an optical signal in each waveguide may further pass through a delay controller in the operation module to adjust a phase and a delay of the optical signal. It should be understood that, when a system runs normally, the delay controller may not need to adjust the phase and the delay.

As shown in (c) in FIG. 8, a beam combining module (for example, the beam combining module 720) may combine optical signals of a plurality of waveguides, and a result output by the beam combining module includes the optical signals of the N wavelengths. Specifically, the beam combining module may combine output results of a plurality of channels in the operation module based on corresponding wavelengths, in other words, for each wavelength, an obtained result is a summation operation result of a plurality of product operation results.

As shown in (d) in FIG. 8, a demultiplexing and recombination module (for example, the demultiplexing and recombination module 730) may demultiplex and recombine the optical signals of the N wavelengths output by the beam combining module. For example, the demultiplexing and recombination module selects, based on a requirement, optical signals of specific Q wavelengths for recombination.

Optionally, the loading and detection module may further detect an output optical signal of the demultiplexing and recombination module from the demultiplexing and recombination module, to obtain the output data.

Case 2: The length of the input data is less than the length of the output data, in other words, x is less than y.

Figure 9:
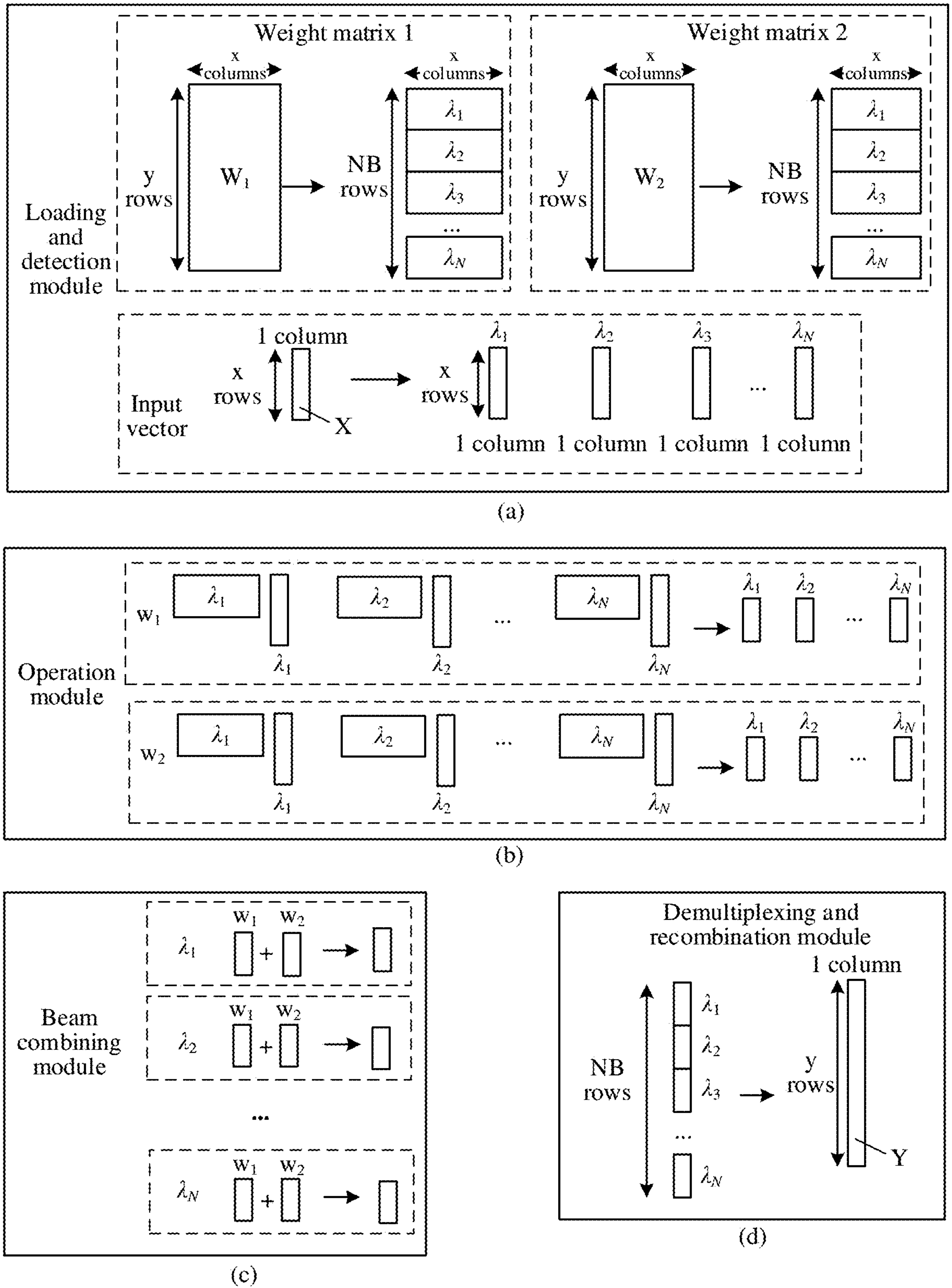
FIG. 9 is another schematic diagram of a data operation process at a fully connected layer according to an embodiment of this application.

FIG. 9 is another schematic diagram of a data operation process at a fully connected layer according to an embodiment of this application. As shown in (a) in FIG. 9, if a length of input data is less than a length of output data, a loading and detection module may split a matrix $W_1$ and a matrix $W_2$ both into N computing parts in a unit of B rows. If y cannot be exactly divided by N, rows for supplementation are filled with o, in other words, zero-padding is performed on redundant data. A quantity of rows obtained through supplementation is denoted as y', and B=y'/N. To be specific, each of the N computing parts of the matrix W, and each of the N computing parts of the matrix $W_2$ both include B rows and x columns, and a wavelength is allocated to each computing part based on wavelengths that can be modulated by an operation module, in other words, wavelengths corresponding to the computing parts of the matrix W, are $\lambda_1$, $\lambda_2$, $\lambda_3$, . . . $\lambda_N$ respectively, and the same is true for the matrix $W_2$. Further, the loading and detection module may replicate a vector X into N pieces, which are denoted as N input parts, in other words, each of the N input parts is the same as the vector X. A corresponding wavelength is allocated to each of the N input parts based on the wavelengths allocated to the N computing parts, in other words, the wavelengths corresponding to the input parts are $\lambda_1$, $\lambda_2$, $\lambda_3$, . . . , $\lambda_N$ respectively.

In a computing process shown in (a) in FIG. 9, there are two weight matrices. Therefore, the operation module includes two groups of modulators, every N modulators are grouped into one group, in other words, 2N modulators are included, and every N modulators correspondingly modulate optical signals whose wavelengths are $\lambda_1$, $\lambda_2$, $\lambda_3$, . . . $\lambda_N$ respectively. The loading and detection module may separately load the N computing parts of the first weight matrix onto wavelengths corresponding to a first group of modulators of the operation module, and separately load the N computing parts of the second weight matrix onto wavelengths corresponding to a second group of modulators of the operation module. Further, the loading and detection module separately loads the N input parts onto wavelengths corresponding to a multiplexing module. The N input parts pass through the multiplexing module (for example, the multiplexing module 740) and a beam splitting module (for example, the beam splitting module 750), or pass through two multiplexing modules (for example, the multiplexing modules 440 and 450) to form two paths of optical signals and separately input the two paths of optical signals to the operation module (for example, a operation module 710), where each path of optical signals includes optical signals of N wavelengths.

As shown in (b) in FIG. 9, in the operation module, each path of optical signals passes through N modulators, and each of the N modulators modulates an optical signal of one wavelength. In other words, the modulator may modulate, to an optical signal of a corresponding wavelength, a computing part loaded by the loading and detection module, to implement a multiplication operation of the computing part corresponding to the wavelength and an input part corresponding to the wavelength. In each waveguide (or referred to as each channel or each group of modulators) of the operation module, the optical signals of the N wavelengths pass through the N modulators, and output results of the N wavelengths are output. An output result of each wavelength is a product operation result of a computing part of the wavelength and an input part of the wavelength. Optionally, an optical signal in each waveguide may further pass through a delay controller in the operation module to adjust a phase and a delay of the optical signal. It should be understood that, when a system runs normally, the delay controller may not need to adjust the phase and the delay.

As shown in (c) in FIG. 9, a beam combining module (for example, the beam combining module 720) may combine optical signals of a plurality of waveguides, and a result output by the beam combining module includes optical signals of N wavelengths. Specifically, the beam combining module may combine output results of a plurality of channels in the operation module based on corresponding wavelengths, in other words, for each wavelength, an obtained result is a summation operation result of a plurality of product operation results.

As shown in (d) in FIG. 9, a demultiplexing and recombination module (for example, the demultiplexing and recombination module 730) may demultiplex and recombine the optical signals of the N wavelengths output by the beam combining module. For example, the demultiplexing and recombination module selects, based on a requirement, optical signals of specific Q wavelengths for recombination. It should be noted that, because extra rows in NB rows compared with y rows are supplemented with an element of o, calculation results of the supplemented rows are also o, and the demultiplexing and recombination module may remove data, and restore to the y rows.

Optionally, the loading and detection module may further detect an output optical signal of the demultiplexing and recombination module from the demultiplexing and recombination module, to obtain the output data.

2. Convolutional Layer

A computing process at the convolutional layer is similar to the computing process at the fully connected layer in the case 2, and a difference lies in that when an operation at the convolutional layer is performed, the N computing parts are N convolution kernels.

Specifically, the optical computing apparatus may receive the input data and a plurality of groups of convolution kernels. Each group includes N convolution kernels, and N is the quantity of wavelengths that can be modulated by the operation module. The loading and detection module may allocate a wavelength to each convolution kernel in each group based on the wavelengths that can be modulated by the operation module, that is, the N convolution kernels correspond to the N wavelengths that can be modulated by the operation module. Further, the loading and detection module may replicate the vector X into N pieces, which are denoted as the N input parts, in other words, each of the N input parts is the same as the vector X. A corresponding wavelength is allocated to each of the N input parts based on wavelengths allocated to the N computing parts.

The loading and detection module may separately load the N convolution kernels of the first group of convolution kernels onto wavelengths corresponding to a first group of modulators of the operation module, and separately load the N convolution kernels of the second group of convolution kernels onto wavelengths corresponding to a second group of modulators of the operation module. Further, the loading and detection module separately loads the N input parts onto wavelengths corresponding to a multiplexing module. The N input parts pass through the multiplexing module (for example, the multiplexing module 740) and a beam splitting module (for example, the beam splitting module 750), or pass through two multiplexing modules (for example, the multiplexing modules 440 and 450) to form two paths of optical signals and separately input the two paths of optical signals to the operation module (for example, a operation module 710), where each path of optical signals includes optical signals of N wavelengths.

In the operation module, each path of optical signals passes through N modulators, and each of the N modulators modulates an optical signal of one wavelength. In other words, the modulator may modulate, to an optical signal of a corresponding wavelength, a computing part loaded by the loading and detection module, to implement a multiplication operation of the computing part corresponding to the wavelength and an input part corresponding to the wavelength. In each waveguide (or referred to as each channel or each group of modulators) of the operation module, the optical signals of the N wavelengths pass through the N modulators, and output results of the N wavelengths are output. An output result of each wavelength is a product operation result of a convolution kernel of the wavelength and an input part of the wavelength. Optionally, an optical signal in each waveguide may further pass through a delay controller in the operation module to adjust a phase and a delay of the optical signal. It should be understood that, when a system runs normally, the delay controller may not need to adjust the phase and the delay.

A beam combining module (for example, the beam combining module 720) may combine optical signals of a plurality of waveguides, and a result output by the beam combining module includes the optical signals of the N wavelengths. Specifically, the beam combining module may combine output results of a plurality of channels in the operation module based on corresponding wavelengths, in other words, for each wavelength, an obtained result is a summation operation result of a plurality of product operation results.

A demultiplexing and recombination module (for example, the demultiplexing and recombination module 730) may demultiplex and recombine the optical signals of the N wavelengths output by the beam combining module. For example, the demultiplexing and recombination module selects, based on a requirement, optical signals of specific Q wavelengths for recombination.

Optionally, the loading and detection module may further detect an output optical signal of the demultiplexing and recombination module from the demultiplexing and recombination module, to obtain the output data.

It should be understood that this embodiment of this application is described by using only modulation of the first group of optical signals and the third group of optical signals as an example. However, in actual application, P groups of optical signals may indicate a same piece of input data (where P is an integer greater than or equal to 1), for example, P is 2, 3, 4, or 5. Each group of optical signals includes a plurality of wavelengths. The operation module may also include P groups of modulators. Each group of modulators is configured to complete a product operation of a weight matrix (or a group of convolution kernels) and a piece of input data, and then a summation operation of a plurality of groups of product operations is implemented by using the beam combining module. Then, the demultiplexing and recombination module obtains a multiply-add operation result of preset wavelength values.

It should be further understood that the optical computing apparatus in this application may be connected to another optical computing architecture as a general-purpose module to implement multi-wavelength multiplexing, or outputs of a plurality of optical computing apparatuses in this application may be used as input again, to implement iterative calculation.

Figure 10:
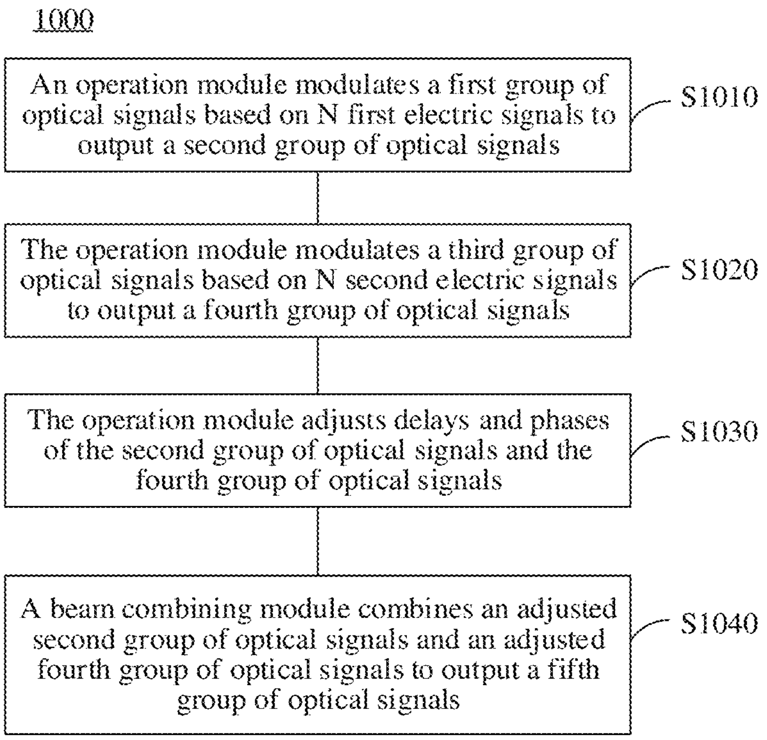
FIG. 10 is a schematic flowchart of an optical computing method according to an embodiment of this application.

FIG. 10 is a schematic flowchart of an optical computing method according to an embodiment of this application. The method 1000 may include the following steps.

S1010: An operation module modulates a first group of optical signals based on N first electric signals to output a second group of optical signals. The first group of optical signals indicates input data. The first group of optical signals includes N input optical signals. Wavelengths of the N input optical signals are all different, where N is a positive integer greater than 2. Wavelengths of optical signals modulated by using the N first electric signals are in one-to-one correspondence with the wavelengths of the N input optical signals. The N first electric signals respectively indicate N parts of a first weight matrix. The second group of optical signals indicates a calculation result of the input data and the first weight matrix.

S1020: The operation module modulates a third group of optical signals based on N second electric signals to output a fourth group of optical signals. The third group of optical signals indicates the input data. The third group of optical signals includes the N input optical signals. Wavelengths of optical signals modulated by using the N second electric signals are in one-to-one correspondence with the wavelengths of the N input optical signals. The N second electric signals respectively indicate N parts of a second weight matrix. The third group of optical signals indicates a calculation result of the input data and the second weight matrix.

S1030: The operation module adjusts delays and phases of the second group of optical signals and the fourth group of optical signals.

S1040: A beam combining module combines an adjusted second group of optical signals and an adjusted fourth group of optical signals to output a fifth group of optical signals. The fifth group of optical signals indicates a multiply-add operation result of the input data and the first weight matrix and the second weight matrix.

Optionally, the method further includes: A demultiplexing and recombination module demultiplexes and/or recombines the fifth group of optical signals to obtain a sixth group of optical signals. The sixth group of optical signals includes optical signals of Q wavelengths in the fifth group of optical signals. The sixth group of optical signals indicates output data, and Q is a positive integer less than or equal to N.

Optionally, the method further includes: A multiplexing module modulates N parts of the input data into the N input optical signals, and multiplexes the N input optical signals into a same waveguide to form a seventh group of optical signals. A beam splitting module splits the seventh group of optical signals to form the first group of optical signals and the third group of optical signals.

Optionally, the method further includes: A multiplexing module modulates N parts of the input data into the N input optical signals, and multiplexes the N input optical signals into a same waveguide to separately form the first group of optical signals and the third group of optical signals.

Optionally, the method further includes: A loading and detection module splits the first weight matrix into N parts, and configures the N parts of the first weight matrix to be in one-to-one correspondence with N wavelengths. The loading and detection module splits the second weight matrix into N parts, and configures the N parts of the second weight matrix to be in one-to-one correspondence with N wavelengths. The loading and detection module separately loads the N first electric signals and the N second electric signals onto the operation module.

Optionally, the method further includes: The loading and detection module transforms the input data into N parts, and configures the N parts of the input data to be in one-to-one correspondence with the N wavelengths. The loading and detection module loads the N parts of the input data onto the multiplexing module. The multiplexing module is configured to transmit the first group of optical signals and the third group of optical signals to the operation module.

Optionally, the operation module includes N first modulators and N second modulators. That an operation module modulates a first group of optical signals based on N first electric signals to output a second group of optical signals includes: The N first modulators modulate the N input optical signals based on the N first electric signals to output the second group of optical signals. Wavelengths of optical signals modulated by the N first modulators are in one-to-one correspondence with the wavelengths of the N input optical signals. That the operation module modulates a third group of optical signals based on N second electric signals to output a fourth group of optical signals includes: The N second modulators modulate the N input optical signals based on the N second electric signals to output the fourth group of optical signals. Wavelengths of optical signals modulated by the N second modulators are in one-to-one correspondence with the wavelengths of the N input optical signals.

Optionally, the operation module includes a first delay controller and a second delay controller. That the operation module adjusts delays and phases of the second group of optical signals and the fourth group of optical signals includes: The first delay controller adjusts the delay and the phase of the second group of optical signals. The second delay controller adjusts the delay and the phase of the fourth group of optical signals.

Optionally, the method further includes: The loading and detection module outputs configuration information to the multiplexing module and the demultiplexing and recombination module. The configuration information indicates the one-to-one correspondence between the N parts of the input data and the N wavelengths. The configuration information is used by the multiplexing module to modulate the N parts of the input data into the N input optical signals, and is used by the demultiplexing and recombination module to perform wavelength demultiplexing.

Optionally, the method further includes: The loading and detection module loads the N first electric signals onto the N first modulators respectively based on wavelengths corresponding to the N first electric signals. A wavelength modulated by each first modulator is the same as a wavelength configured by the loading and detection module for each first electric signal. The N second electric signals are loaded onto the N second modulators respectively based on wavelengths corresponding to the N second electric signals. A wavelength modulated by each second modulator is the same as a wavelength configured by the loading and detection module for each second electric signal.

According to this embodiment of this application, the wavelengths of the optical signals modulated by using the N first electric signals all correspond to the wavelengths of the N input optical signals, and each of the N first electric signals is used to modulate only an optical signal of one wavelength. Therefore, modulation performed by using the N first electric signals on the N input optical signals may be considered as parallel modulation between optical signals of N wavelengths, and modulation performed by using the N second electric signals on the N input optical signals may also be considered as parallel modulation between optical signals of N wavelengths. In addition, both the N first electric signals and the N second electric signals may implement modulation on the input data, in other words, modulation between the first weight matrix and the second weight matrix is also parallel. The optical computing apparatus combines parallel modulation results of the N first electric signals and the N second electric signals, to implement the multiply-add operation result of the input data and the first weight matrix and the second weight matrix. This helps improve a parallel computing capability of the optical computing apparatus.

Figure 11:
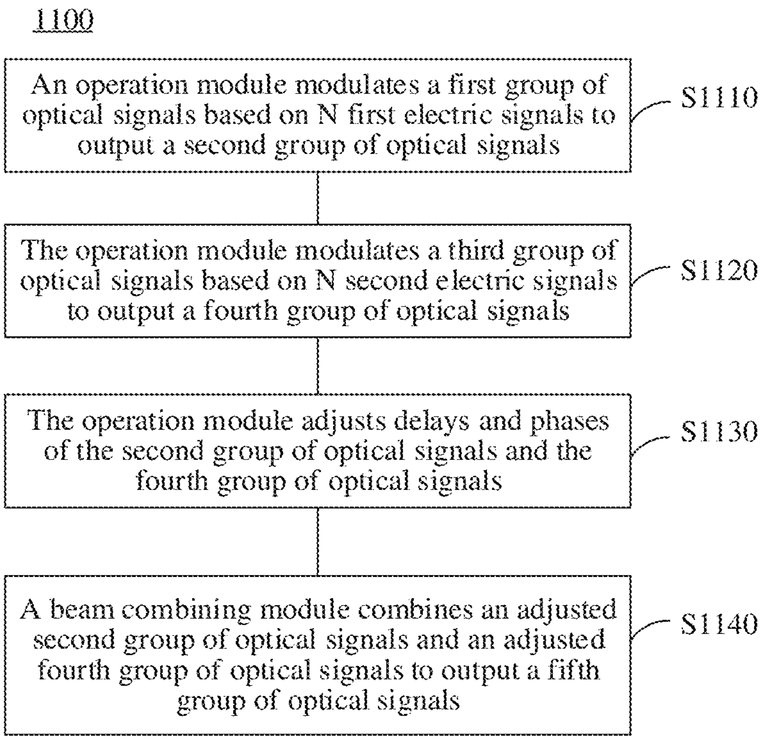
FIG. 11 is another schematic flowchart of an optical computing method according to an embodiment of this application.

FIG. 11 is a schematic flowchart of an optical computing method according to an embodiment of this application. The method 1100 may include the following steps.

S1110: An operation module modulates a first group of optical signals based on N first electric signals to output a second group of optical signals. The first group of optical signals indicates input data. The first group of optical signals includes N input optical signals. Wavelengths of the N input optical signals are all different, where N is a positive integer greater than 2. Wavelengths of optical signals modulated by using the N first electric signals are in one-to-one correspondence with the wavelengths of the N input optical signals. The N first electric signals respectively indicate N first convolution kernels. The second group of optical signals indicates a calculation result of the input data and the N first convolution kernels.

S1120: The operation module modulates a third group of optical signals based on N second electric signals to output a fourth group of optical signals. The third group of optical signals indicates the input data. The third group of optical signals includes the N input optical signals. Wavelengths of optical signals modulated by using the N second electric signals are in one-to-one correspondence with the wavelengths of the N input optical signals. The N second electric signals respectively indicate N second convolution kernels. The third group of optical signals indicates a calculation result of the input data and the N second convolution kernels.

S1130: The operation module adjusts delays and phases of the second group of optical signals and the fourth group of optical signals.

S1140: A beam combining module combines an adjusted second group of optical signals and an adjusted fourth group of optical signals to output a fifth group of optical signals. The fifth group of optical signals indicates a multiply-add operation result of the input data and the N first convolution kernels and the N second convolution kernels.

Optionally, the method further includes: A demultiplexing and recombination module demultiplexes and/or recombines the fifth group of optical signals to obtain a sixth group of optical signals. The sixth group of optical signals includes optical signals of Q wavelengths in the fifth group of optical signals. The sixth group of optical signals indicates output data, and Q is a positive integer less than or equal to N.

Optionally, the method further includes: A multiplexing module modulates N parts of the input data into the N input optical signals, and multiplexes the N input optical signals into a same waveguide to form a seventh group of optical signals. A beam splitting module splits the seventh group of optical signals to form the first group of optical signals and the third group of optical signals.

Optionally, the method further includes: A multiplexing module modulates N parts of the input data into the N input optical signals, and multiplexes the N input optical signals into a same waveguide to separately form the first group of optical signals and the third group of optical signals.

Optionally, the method further includes: A loading and detection module configures the N first convolution kernels to be in one-to-one correspondence with N wavelengths, and configures the N second convolution kernels to be in one-to-one correspondence with N wavelengths. The loading and detection module separately loads the N first electric signals and the N second electric signals onto the operation module.

Optionally, the method further includes: The loading and detection module transforms the input data into N parts, and configures the N parts of the input data to be in one-to-one correspondence with the N wavelengths. The loading and detection module loads the N parts of the input data onto the multiplexing module. The multiplexing module is configured to transmit the first group of optical signals and the third group of optical signals to the operation module.

Optionally, the operation module includes N first modulators and N second modulators. That an operation module modulates a first group of optical signals based on N first electric signals to output a second group of optical signals includes: The N first modulators modulate the N input optical signals based on the N first electric signals to output the second group of optical signals. Wavelengths of optical signals modulated by the N first modulators are in one-to-one correspondence with the wavelengths of the N input optical signals. That the operation module modulates a third group of optical signals based on N second electric signals to output a fourth group of optical signals includes: The N second modulators modulate the N input optical signals based on the N second electric signals to output the fourth group of optical signals. Wavelengths of optical signals modulated by the N second modulators are in one-to-one correspondence with the wavelengths of the N input optical signals.

Optionally, the operation module includes a first delay controller and a second delay controller. That the operation module adjusts delays and phases of the second group of optical signals and the fourth group of optical signals includes: The first delay controller adjusts the delay and the phase of the second group of optical signals. The second delay controller adjusts the delay and the phase of the fourth group of optical signals.

Optionally, the method further includes: The loading and detection module outputs configuration information to the multiplexing module and the demultiplexing and recombination module. The configuration information indicates the one-to-one correspondence between the N parts of the input data and the N wavelengths. The configuration information is used by the multiplexing module to modulate the N parts of the input data into the N input optical signals, and is used by the demultiplexing and recombination module to perform wavelength demultiplexing.

Optionally, the method further includes: The loading and detection module loads the N first electric signals onto the N first modulators respectively based on wavelengths corresponding to the N first electric signals. A wavelength modulated by each first modulator is the same as a wavelength configured by the loading and detection module for each first electric signal. The N second electric signals are loaded onto the N second modulators respectively based on wavelengths corresponding to the N second electric signals. A wavelength modulated by each second modulator is the same as a wavelength configured by the loading and detection module for each second electric signal.

According to this embodiment of this application, the wavelengths of the optical signals modulated by using the N first electric signals all correspond to the wavelengths of the N input optical signals, and each of the N first electric signals is used to modulate only an optical signal of one wavelength. Therefore, modulation performed by using the N first electric signals on the N input optical signals may be considered as parallel modulation between optical signals of N wavelengths, and modulation performed by using the N second electric signals on the N input optical signals may also be considered as parallel modulation between optical signals of N wavelengths. In addition, both the N first electric signals and the N second electric signals may implement modulation on the input data, in other words, modulation between the N first convolution kernels and the N second convolution kernels is also parallel. The optical computing apparatus combines parallel modulation results of the N first electric signals and the N second electric signals, to implement the multiply-add operation result of the input data and the N first convolution kernels and the N second convolution kernels. This helps improve a parallel computing capability of the optical computing apparatus.

This application further provides an optical computing system, including any one of the foregoing optical computing apparatuses.

All or some of the foregoing embodiments may be implemented by using software, hardware, firmware, or any combination thereof. When the software is used for implementation, the all or some of the embodiments may be implemented in a form of a computer program product. The computer program product includes one or more computer instructions. When the computer instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a high-density digital video disc (DVD)), a semiconductor medium (for example, a solid-state drive (SSD)), or the like.

In embodiments of this application, the word “example” or “for example” is used to represent giving an example, an illustration, or a description. Any embodiment or design scheme described as an “example” in this application should not be explained as being more preferred or having more advantages than another embodiment or design scheme. Exactly, the term “example” is used to present a concept in a specific manner.

It should be understood that, an “embodiment” mentioned throughout this specification means that particular features, structures, or characteristics related to this embodiment are included in at least one embodiment of this application. Therefore, embodiments in the entire specification do not necessarily refer to a same embodiment. In addition, the particular features, structures, or characteristics may be combined in one or more embodiments in any appropriate manner.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application. Names of all nodes and messages in this application are merely names set for ease of description in this application, and may be different in an actual network. It should not be understood that names of various nodes and messages are limited in this application. On the contrary, any name that has a function that is the same as or similar to that of the node or the message used in this application is considered as a method or an equivalent replacement in this application, and falls within the protection scope of this application.

The term "at least one of . . . " in this specification represents all or any combination of the listed items. For example, "at least one of A, B, and C" may represent the following six cases: A exists alone, B exists alone, C exists alone, both A and B exist, both B and C exist, and both A, B, and C exist. In this specification, "at least one" means one or more. "A plurality of" means two or more.

It should be understood that in embodiments of this application, "B corresponding to A" indicates that B is associated with A, and B may be determined based on A. However, it should be further understood that determining B based on A does not mean that B is determined based only on A. B may alternatively be determined based on A and/or other information. The terms "include", "comprise", "have", and their variants all mean "include but are not limited to", unless otherwise specifically emphasized in another manner.

It should be understood that, in various embodiments of this application, first, second, and various numbers are merely used to distinguish for ease of description, and are not used to limit the scope of embodiments of this application. For example, different information is distinguished.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the apparatus embodiment described above is merely an example. For example, division of the units is merely division of logical functions and there may be another division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, to be specific, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for enabling a computer device (which may be a personal computer, a server, or a network device) to perform all or some of the steps of the methods described in embodiments of this application. The foregoing storage medium includes any medium that can store program code, such as a USB flash drive, a removable hard disk drive, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An optical computing apparatus, comprising:

an operation module, comprising at least one modulator and at least one delay waveguide or phase shifter, wherein the operation module is configured to:

modulate a first group of optical signals based on N first electric signals to output a second group of optical signals, wherein the first group of optical signals indicates input data, the first group of optical signals comprises N input optical signals, wavelengths of the N input optical signals are all different, N is a positive integer greater than 2, wavelengths of optical signals modulated based on the N first electric signals are in one-to-one correspondence with the wavelengths of the N input optical signals, the N first electric signals respectively indicate N parts of a first weight matrix, and the second group of optical signals indicates a calculation result of the input data and the first weight matrix;

modulate a third group of optical signals based on N second electric signals to output a fourth group of optical signals, wherein the third group of optical signals indicates the input data, the third group of optical signals comprises the N input optical signals, wavelengths of optical signals modulated based on the N second electric signals are in one-to-one correspondence with the wavelengths of the N input optical signals, the N second electric signals respectively indicate N parts of a second weight matrix, and the third group of optical signals indicates a calculation result of the input data and the second weight matrix; and adjust delays and phases of the second group of optical signals and the fourth group of optical signals, to obtain an adjusted second group of optical signals and an adjusted fourth group of optical signals; and a beam combining module, comprising at least one first beam splitter or first directional coupler, wherein the beam combining module is configured to combine the adjusted second group of optical signals and the adjusted fourth group of optical signals to output a fifth group of optical signals, wherein the fifth group of optical signals indicates a multiply-add operation result of the input data and the first weight matrix and the second weight matrix.

2. The apparatus according to claim 1, further comprising:

a demultiplexing and recombination module, comprising at least one grating and at least one optical switch or optical router, wherein the demultiplexing and recombination module is configured to:

demultiplex or recombine, or demultiplex and recombine, the fifth group of optical signals to obtain a sixth group of optical signals, wherein the sixth group of optical signals comprises optical signals of Q wavelengths in the fifth group of optical signals, the sixth group of optical signals indicates output data, and Q is a positive integer less than or equal to N.

3. The apparatus according to claim 1, further comprising:

a multiplexing module, comprising at least one grating, wherein the multiplexing module is configured to modulate N parts of the input data into the N input optical signals, and multiplex the N input optical signals into a same waveguide to form a seventh group of optical signals; and a beam splitting module, comprising at least one second beam splitter or second directional coupler, wherein the beam splitting module is configured to split the seventh group of optical signals to form the first group of optical signals and the third group of optical signals.

4. The apparatus according to claim 1, further comprising:

a multiplexing module, comprising at least one grating, wherein the multiplexing module is configured to modulate N parts of the input data into the N input optical signals, and multiplex the N input optical signals into a same waveguide to separately form the first group of optical signals and the third group of optical signals.

5. The apparatus according to claim 1, further comprising:

a loading and detection module, comprising a photoelectric detector and a processor, wherein the loading and detection module is configured to:

split the first weight matrix into N parts, and configure the N parts of the first weight matrix to be in one-to-one correspondence with N wavelengths;

split the second weight matrix into N parts, and configure the N parts of the second weight matrix to be in one-to-one correspondence with the N wavelengths; and separately load the N first electric signals and the N second electric signals onto the operation module.

6. The apparatus according to claim 5, wherein the loading and detection module is further configured to:

transform the input data into N parts, and configure the N parts of the input data to be in one-to-one correspondence with the N wavelengths; and load the N parts of the input data onto a multiplexing module; and wherein the multiplexing module is configured to transmit the first group of optical signals and the third group of optical signals to the operation module.

7. The apparatus according to claim 1, wherein the operation module comprises:

N first modulators, configured to modulate the N input optical signals based on the N first electric signals, wherein wavelengths of optical signals modulated by the N first modulators are in one-to-one correspondence with the wavelengths of the N input optical signals; and N second modulators, configured to modulate the N input optical signals based on the N second electric signals, wherein wavelengths of optical signals modulated by the N second modulators are in one-to-one correspondence with the wavelengths of the N input optical signals.

8. The apparatus according to claim 1, wherein the operation module further comprises:

a first delay controller, configured to adjust the delay and the phase of the second group of optical signals; and a second delay controller, configured to adjust the delay and the phase of the fourth group of optical signals.

9. A method, comprising:

modulating, by an operation module, a first group of optical signals based on N first electric signals, to output a second group of optical signals, wherein the first group of optical signals indicates input data, the first group of optical signals comprises N input optical signals, wavelengths of the N input optical signals are all different, N is a positive integer greater than 2, wavelengths of optical signals modulated based on the N first electric signals are in one-to-one correspondence with the wavelengths of the N input optical signals, the N first electric signals respectively indicate N parts of a first weight matrix, and the second group of optical signals indicates a calculation result of the input data and the first weight matrix;

modulating, by the operation module, a third group of optical signals based on N second electric signals to output a fourth group of optical signals, wherein the third group of optical signals indicates the input data, the third group of optical signals comprises the N input optical signals, wavelengths of optical signals modulated based on the N second electric signals are in one-to-one correspondence with the wavelengths of the N input optical signals, the N second electric signals respectively indicate N parts of a second weight matrix, and the third group of optical signals indicates a calculation result of the input data and the second weight matrix;

adjusting, by the operation module, delays and phases of the second group of optical signals and the fourth group of optical signals, to obtain an adjusted second group of optical signals and an adjusted fourth group of optical signals; and combining, by a beam combining module, the adjusted second group of optical signals and the adjusted fourth group of optical signals to output a fifth group of optical signals, wherein the fifth group of optical signals indicates a multiply-add operation result of the input data and the first weight matrix and the second weight matrix.

10. The method according to claim 9, further comprising:

demultiplexing or recombining, or demultiplexing and recombining, by a demultiplexing and recombination module, the fifth group of optical signals to obtain a sixth group of optical signals, wherein the sixth group of optical signals comprises optical signals of Q wavelengths in the fifth group of optical signals, the sixth group of optical signals indicates output data, and Q is a positive integer less than or equal to N.

11. The method according to claim 9, further comprising:

modulating, by a multiplexing module, N parts of the input data into the N input optical signals, and multiplexing the N input optical signals into a same waveguide to form a seventh group of optical signals; and splitting, by a beam splitting module, the seventh group of optical signals to form the first group of optical signals and the third group of optical signals.

12. The method according to claim 9, further comprising:

modulating, by a multiplexing module, N parts of the input data into the N input optical signals, and multiplexing the N input optical signals into a same waveguide to separately form the first group of optical signals and the third group of optical signals.

13. The method according to claim 9, further comprising:

splitting, by a loading and detection module, the first weight matrix into N parts, and configuring the N parts of the first weight matrix to be in a one-to-one correspondence with N wavelengths;

splitting, by the loading and detection module, the second weight matrix into N parts, and configuring the N parts of the second weight matrix to be in a one-to-one correspondence with the N wavelengths; and separately loading, by the loading and detection module, the N first electric signals and the N second electric signals onto the operation module.

14. The method according to claim 13, further comprising:

transforming, by the loading and detection module, the input data into N parts, and configuring the N parts of the input data to be in a one-to-one correspondence with the N wavelengths; and loading, by the loading and detection module, the N parts of the input data onto a multiplexing module, wherein the multiplexing module is configured to transmit the first group of optical signals and the third group of optical signals to the operation module.

15. The method according to claim 9, wherein the operation module comprises N first modulators and N second modulators; and wherein:

modulating, by the operation module, the first group of optical signals based on the N first electric signals to output the second group of optical signals comprises:

modulating, by the N first modulators, the N input optical signals based on the N first electric signals to output the second group of optical signals, wherein wavelengths of optical signals modulated by the N first modulators are in a one-to-one correspondence with the wavelengths of the N input optical signals; and modulating, by the operation module, the third group of optical signals based on the N second electric signals to output the fourth group of optical signals comprises:

modulating, by the N second modulators, the N input optical signals based on the N second electric signals to output the fourth group of optical signals, wherein wavelengths of optical signals modulated by the N second modulators are in a one-to-one correspondence with the wavelengths of the N input optical signals.

16. The method according to claim 9, wherein the operation module comprises a first delay controller and a second delay controller, and adjusting, by the operation module, the delays and phases of the second group of optical signals and the fourth group of optical signals, to obtain the adjusted second group of optical signals and the adjusted fourth group of optical signals comprises:

adjusting, by the first delay controller, the delay and the phase of the second group of optical signals, to obtain the adjusted second group of optical signals; and adjusting, by the second delay controller, the delay and the phase of the fourth group of optical signals, to obtain the adjusted fourth group of optical signals.

17. An optical computing system, comprising:

an optical computing apparatus, comprising:

an operation module, configured to:

modulate a first group of optical signals based on N first electric signals to output a second group of optical signals, wherein the first group of optical signals indicates input data, the first group of optical signals comprises N input optical signals, wavelengths of the N input optical signals are all different, N is a positive integer greater than 2, wavelengths of optical signals modulated based on the N first electric signals are in a one-to-one correspondence with the wavelengths of the N input optical signals, the N first electric signals respectively indicate N parts of a first weight matrix, and the second group of optical signals indicates a calculation result of the input data and the first weight matrix, wherein modulate a third group of optical signals based on N second electric signals to output a fourth group of optical signals, wherein the third group of optical signals indicates the input data, the third group of optical signals comprises the N input optical signals, wavelengths of optical signals modulated by using the N second electric signals are in a one-to-one correspondence with the wavelengths of the N input optical signals, the N second electric signals respectively indicate N parts of a second weight matrix, and the third group of optical signals indicates a calculation result of the input data and the second weight matrix; and adjust delays and phases of the second group of optical signals and the fourth group of optical signals, to obtain an adjusted second group of optical signals and an adjusted fourth group of optical signals; and a beam combining module, configured to combine the adjusted second group of optical signals and the adjusted fourth group of optical signals to output a fifth group of optical signals, wherein the fifth group of optical signals indicates a multiply-add operation result of the input data and the first weight matrix and the second weight matrix.

18. The optical computing system according to claim 17, wherein the apparatus further comprises:

a demultiplexing and recombination module, configured to demultiplex or recombine, or demultiplex and recombine, the fifth group of optical signals to obtain a sixth group of optical signals, wherein the sixth group of optical signals comprises optical signals of Q wavelengths in the fifth group of optical signals, the sixth group of optical signals indicates output data, and Q is a positive integer less than or equal to N.

19. The optical computing system according to claim 17, wherein the apparatus further comprises:

a multiplexing module, configured to modulate N parts of the input data into the N input optical signals, and multiplex the N input optical signals into a same waveguide to form a seventh group of optical signals; and a beam splitting module, configured to split the seventh group of optical signals to form the first group of optical signals and the third group of optical signals.

20. The optical computing system according to claim 17, wherein the apparatus further comprises:

a multiplexing module, configured to modulate N parts of the input data into the N input optical signals, and multiplex the N input optical signals into a same waveguide to separately form the first group of optical signals and the third group of optical signals.

* * * * *